US012658812B2

(12) United States Patent
Liu et al.

(10) Patent No.: US 12,658,812 B2
(45) Date of Patent: Jun. 16, 2026

(54) DC BIAS SUPPRESSION METHOD AND HIGH-FREQUENCY POWER CONVERSION CIRCUIT USING THE SAME

(71) Applicant: Delta Electronics (Shanghai) Co., Ltd., Shanghai (CN)

(72) Inventors: Hong Liu, Shanghai (CN); Wen Zhang, Shanghai (CN); Baihui Song, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 188 days.

(21) Appl. No.: 18/592,539

(22) Filed: Mar. 1, 2024

(65) Prior Publication Data

US 2024/0322664 A1 Sep. 26, 2024

(30) Foreign Application Priority Data

Mar. 21, 2023 (CN) .......................... 202310280844.5

(51) Int. Cl.
| | |
|---|---|
| *H02M 3/335* | (2006.01) |
| *H02M 1/00* | (2006.01) |
| *H02M 1/38* | (2007.01) |
| *H02M 3/00* | (2006.01) |
| *H02M 7/48* | (2007.01) |

(52) U.S. Cl.
CPC ..... *H02M 3/33584* (2013.01); *H02M 1/0012* (2021.05); *H02M 1/0054* (2021.05); *H02M 1/385* (2021.05); *H02M 3/01* (2021.05); *H02M 3/33515* (2013.01); *H02M 3/33569* (2013.01);

(Continued)

(58) Field of Classification Search
CPC .. H02M 1/0012; H02M 3/01; H02M 3/33515; H02M 3/33569; H02M 7/4807; H02M 1/0003; H02M 3/33584; H02M 1/0054; H02M 1/088; H02M 1/385
See application file for complete search history.

(56) References Cited

U.S. PATENT DOCUMENTS

| | | | | |
|---|---|---|---|---|
| 9,178,437 | B2 * | 11/2015 | Rosado | ............. H02M 3/33507 |
| 9,496,797 | B2 * | 11/2016 | Panov | ..................... H02M 1/40 |

(Continued)

FOREIGN PATENT DOCUMENTS

| | | |
|---|---|---|
| CN | 111525811 B | 9/2021 |
| CN | 113328632 B | 5/2022 |

(Continued)

*Primary Examiner* — Yusef A Ahmed
(74) *Attorney, Agent, or Firm* — CKC & Partners Co., LLC

(57) ABSTRACT

The disclosure discloses a DC bias suppression method and a high-frequency power conversion circuit using the same. The high-frequency power conversion circuit includes a high-frequency AC port, a switching circuit, a DC port and a power source connected sequentially, and the DC bias suppression method includes: acquiring voltage information or current information of the DC port at N times, where N≥2; obtaining a corresponding first voltage difference or a corresponding first current difference according to the voltage information or the current information at the N times; regulating a duty ratio of a driving signal according to the first voltage difference or the first current difference; and regulating duty ratios of switching tubes in the switching circuit according to the driving signal.

16 Claims, 22 Drawing Sheets

(52) U.S. Cl.
CPC ........ *H02M 7/4807* (2013.01); *H02M 1/0003*
(2021.05)

(56) References Cited

U.S. PATENT DOCUMENTS

| | | | | |
|---|---|---|---|---|
| 9,774,263 | B1* | 9/2017 | Chen | H02M 7/217 |
| 10,097,106 | B1* | 10/2018 | Takagi | H02M 1/4258 |
| 10,756,617 | B2* | 8/2020 | Wei | H02M 1/083 |
| 10,951,120 | B2* | 3/2021 | Chen | H02M 3/33515 |
| 11,742,808 | B1* | 8/2023 | Krishnamoorthy | H02M 1/007 |
| | | | | 330/10 |
| 2002/0186026 | A1* | 12/2002 | Elferich | H02M 3/33561 |
| | | | | 324/652 |
| 2012/0081934 | A1* | 4/2012 | Garrity | H02M 7/46 |
| | | | | 363/37 |
| 2014/0198538 | A1* | 7/2014 | Kimura | H02M 3/33507 |
| | | | | 363/21.09 |
| 2014/0198542 | A1* | 7/2014 | Swamy | H02M 1/4225 |
| | | | | 363/126 |
| 2015/0138844 | A1* | 5/2015 | Karlsson | H02M 3/33546 |
| | | | | 363/21.1 |
| 2015/0229225 | A1* | 8/2015 | Jang | H02M 3/285 |
| | | | | 363/17 |
| 2015/0333634 | A1* | 11/2015 | Yoshida | H02M 3/3353 |
| | | | | 363/21.03 |
| 2016/0094134 | A1* | 3/2016 | Iyasu | H02M 3/3378 |
| | | | | 363/17 |
| 2017/0098993 | A1* | 4/2017 | Scherbaum | H02M 3/33546 |
| 2017/0179836 | A1* | 6/2017 | Kondo | H02M 3/33546 |
| 2017/0250617 | A1* | 8/2017 | Kondo | H02M 3/1588 |
| 2018/0219485 | A1* | 8/2018 | Babazadeh | H02M 3/3376 |
| 2018/0234007 | A1* | 8/2018 | Xu | H02M 3/33523 |
| 2018/0323700 | A1* | 11/2018 | Mizutani | H02M 3/33553 |
| 2019/0317141 | A1* | 10/2019 | Karlsson | H02M 1/32 |
| 2020/0036287 | A1* | 1/2020 | Peretz | H03F 3/2171 |
| 2020/0112244 | A1* | 4/2020 | Chen | H02M 1/143 |
| 2020/0186047 | A1* | 6/2020 | Sen | H02M 3/33523 |
| 2020/0287468 | A1* | 9/2020 | Mizutani | H02M 7/53871 |
| 2020/0389095 | A1* | 12/2020 | Kajiyama | H02M 3/33584 |
| 2021/0013803 | A1* | 1/2021 | Tanaka | H02M 1/088 |
| 2021/0135578 | A1* | 5/2021 | Tanaka | H02M 7/537 |
| 2021/0203237 | A1* | 7/2021 | Hang | H02M 1/00 |
| 2021/0249963 | A1* | 8/2021 | Kajiyama | H02M 3/33573 |
| 2021/0313870 | A1* | 10/2021 | Iwabuki | H02M 1/007 |
| 2021/0359609 | A1* | 11/2021 | Leirens | H02M 3/33584 |
| 2022/0103015 | A1* | 3/2022 | Nussbaum | H02J 50/10 |
| 2022/0149742 | A1* | 5/2022 | Hayase | H02M 7/219 |
| 2022/0158548 | A1* | 5/2022 | Jang | H02M 3/33507 |
| 2023/0068964 | A1* | 3/2023 | Liu | H02M 3/33573 |
| 2023/0179091 | A1* | 6/2023 | Liu | H02M 3/33573 |
| | | | | 363/17 |
| 2023/0396169 | A1* | 12/2023 | Kouno | H02M 5/458 |
| 2023/0402927 | A1* | 12/2023 | Kawai | H02M 3/3353 |
| 2024/0022167 | A1* | 1/2024 | Liu | H02M 3/01 |
| 2024/0088702 | A1* | 3/2024 | Shirakawa | B60L 58/27 |
| 2024/0388208 | A1* | 11/2024 | Tarraf | H02M 3/33584 |
| 2025/0007392 | A1* | 1/2025 | Liu | H02M 3/33576 |
| 2025/0141348 | A1* | 5/2025 | Xu | H02M 1/32 |

FOREIGN PATENT DOCUMENTS

| | | | |
|---|---|---|---|
| CN | 112234833 | B | 6/2022 |
| JP | 7088428 | B1 | 6/2022 |

* cited by examiner

<u>10</u>

20

<u>30</u>

<u>40</u>

C7

C8

<u>50</u>

DC BIAS SUPPRESSION METHOD AND HIGH-FREQUENCY POWER CONVERSION CIRCUIT USING THE SAME

CROSS-REFERENCE TO RELATED APPLICATIONS

This non-provisional application claims priority under 35 U.S.C. § 119(a) on patent application Ser. No. 20/231, 0280844.5 filed in P.R. China on Mar. 21, 2023, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

BACKGROUND OF THE INVENTION

1. Field of the Invention

The disclosure relates to the field of power electronics equipment, and particularly to a DC bias suppression method and a high-frequency power conversion circuit using the same.

2. Related Art

LLCs act as isolated DC-DC converters, and are widely applied to various power sources with large and small powers due to advantages of high efficiency, a small volume, and the like. With increasing of an access ratio of energy storage units in the power grid, the requirement for bidirectional energy operation is provided to the power electronics equipment connected to the power grid. For example, electric vehicle (EV) charging station system shall interact with the power grid, and the data center power supply system having energy storage needs power for mutual scheduling.

In hardware topology, as shown in FIG. 1, the LLC converter in FIG. 1 includes a high-frequency transformer, a half-bridge circuit including Q1 and Q2 and configured at a primary side of the transformer, a full-bridge circuit C1 including S1, S2, S3 and S4 and configured at a secondary side of the transformer, and a resonant capacitor Cr configured at the primary side. Circuit structure of the LLC converter is asymmetrical. When positively operating (inverter operation of the primary side, and rectifier operation of the secondary side), the primary side is the half-bridge circuit, so a port voltage of the transformer includes DC components, but existence of Cr has blocking effect on the DC components, and a resonant current does not have DC bias. However, when the LLC circuit is reversely operated (inverter operation of the secondary side, and rectifier operation of the primary side), due to existence of circumstances such as a sum of voltage drop of the pair transistors (S1, S4 and S2, S3) in the full-bridge circuit C1 of the secondary circuit is different, a gate driving signal of the switching tubes is delayed, and precision and resolution of the PWM is not sufficient, and a dead zone, there often has the problem of inconsistency between the accumulated high level time of the switching tubes S1 and S4 and the accumulated high level time of the switching tubes S2 and S3, i.e., the port voltage of the transformer still has tiny DC components. Since there is no capacitor for blocking, a resonant current iLs and a magnetic flux density of the transformer have DC bias, DC offset of such magnetic flux density causes an increase of loss of the transformer, even burning of the magnetic core due to magnetic saturation, and a DC bias current in the iLs also causes an increase of stress of the switching tubes and an increase of loss of the switches. To sum up, the LLC converter has many advantages and wide application scenarios, the DC bias problem limits its reverse operating capability, so as for expanding the working application scenarios and ensuring safety of reverse operation, the DC bias control of the LLC is very meaningful.

In order to satisfy the requirement for bidirectional operation, the LLC circuit is often modified to a symmetrical CLLC circuit in the industry, and as shown in FIG. 2, a high-frequency blocking capacitor is connected in series at the secondary side to filter DC offset in the circuit. However, in many applications, as compared to the primary side, the LLC secondary side is often low voltage and high current scenarios, and often shall select a capacitor with large capacitance. However, as for the high-frequency AC capacitor with large capacitance, the volume is often large, and the cost is high. In addition, a large load current flows through the capacitor at the secondary side, so it also brings additional loss, accelerates aging of the capacitor, and affects service life and stability. In large current occasions, the volume and loss of the capacitor are large, and improvement of the power density is limited. Therefore, although the CLLC circuit solves the problem of magnetic balance, considering of various factors such as cost, and the like, it shall further seek for an active control way without adding hardware cost in order to further improve efficiency and the power density.

Similarly with application of the LLC, the dual active full-bridge bidirectional DC/DC converter (DAB) includes two voltage source type full-bridge circuits and one high-frequency transformer. Just due to symmetry of the circuit structure, bidirectional transmission of power flow can be realized. Moreover, the passive device only has one inductor connected in series to the high-frequency transformer, so stray inductance and leakage inductance of the transformer can be directly utilized to transfer energy without worrying about the problem of loss brought by leakage inductance of some other topologies. Although the DAB has many advantages and wide application scenarios, it also has the same problem as reverse operation of the LLC, and due to the reason of inconsistent parameters, such as, turn-on time of the upper and lower transistors is inconsistent, a sum of voltage drop of the H-bridge pair transistors is different, a gate driving signal of the switching tubes is delayed, and precision and resolution of the PWM are not sufficient, it may lead to volt second imbalance between the transformer and the inductor, causing the problem of DC offset in an inductive current of the DAB converter and the magnetic flux density of the transformer. Such DC offset in the magnetic flux density will cause an increase of loss of the transformer and the inductor, even burning of the magnetic core due to magnetic saturation.

How to effectively solve the deficiencies of the high-frequency power conversion circuit also becomes the current target urgently to be improved in the relevant fields.

SUMMARY OF THE INVENTION

An object of the invention is to provide a DC bias suppression method and a high-frequency power conversion circuit, which can solve one or more deficiencies in the prior art.

In order to achieve the object, the present disclosure provides a DC bias suppression method applied to a high-frequency power conversion circuit, wherein the high-frequency power conversion circuit includes a high-frequency AC port, a switching circuit, a DC port and a power source connected sequentially, the DC bias suppression method including:

acquiring voltage information or current information of the DC port at N times, where N≥2; obtaining a corresponding first voltage difference or a first current difference according to the voltage information or the current information at the N times; regulating a duty ratio of a driving signal according to the first voltage difference or the first current difference; and regulating duty ratios of switching tubes in the switching circuit according to the driving signal.

The present disclosure further provides a high-frequency power conversion circuit for controlling using the DC bias suppression method, including: m first side high-frequency circuits including first high-frequency AC ports, first switching circuits and first DC ports connected sequentially, and a controller, where m≥1, wherein at least one of the m first side high-frequency circuits is controlled by the controller according to the method: acquiring voltage information or current information of the first DC ports at N times, where N≥2; obtaining a corresponding first voltage difference or a first current difference according to the voltage information or the current information at the N times; regulating a duty ratio of a first driving signal according to the first voltage difference or the first current difference; and regulating duty ratios of switching tubes in the first switching circuits according to the first driving signal.

The DC bias suppression method provided in the present disclosure solves the problem of DC bias in the resonant current of the high-frequency AC port when the high-frequency power conversion circuit is reversely operated (inverter operation of the secondary side, and rectifier operation of the primary side), and it is unnecessary to make additional hardware filtering or phase-shift processing on the DC port voltage of the high-frequency power conversion circuit, so control is simple and easy to implement. Moreover, the range of application is wide, and it is suitable for frequency modulation control circuits (such as, LLC), and is also suitable for phase-shift control circuits (such as, DAB) or other non-LLC circuits including a bridge circuit. In addition, the method is flexible in sampling without filtering operation, and has a fast control speed.

BRIEF DESCRIPTION OF THE DRAWINGS

To clearly explain the technical solution implemented in the present disclosure, hereinafter simple introduction is made to the accompanying drawings used in the embodiments.

Additional aspects and advantages of the present disclosure are partially explained in the below description, and partially become apparent from the description, or can be obtained from practice of the present disclosure.

DETAILED EMBODIMENTS OF THE INVENTION

Now the exemplary embodiments are comprehensively described with reference to the accompanying drawings. However, the exemplary embodiments can be implemented in various forms, and shall not be understood to be limited to the described embodiments. On the contrary, these embodiments are provided to make the disclosure comprehensive and complete, and concept of the exemplary embodiments is fully and completely conveyed to those skilled in the art.

When introducing the described and/or illustrated factors or components or the like, the words "one", "first", "the" and "at least one" represent one or more factors or components, or the like. The terms "comprise", "include" and "have" represent an open and including meaning, and refer to other factors or components, or the like, except listed factors, components, or the like. Moreover, the terms "first", "second" and the like in the claims are only used as signs, instead of limiting the numbers of the object.

Figure 3:
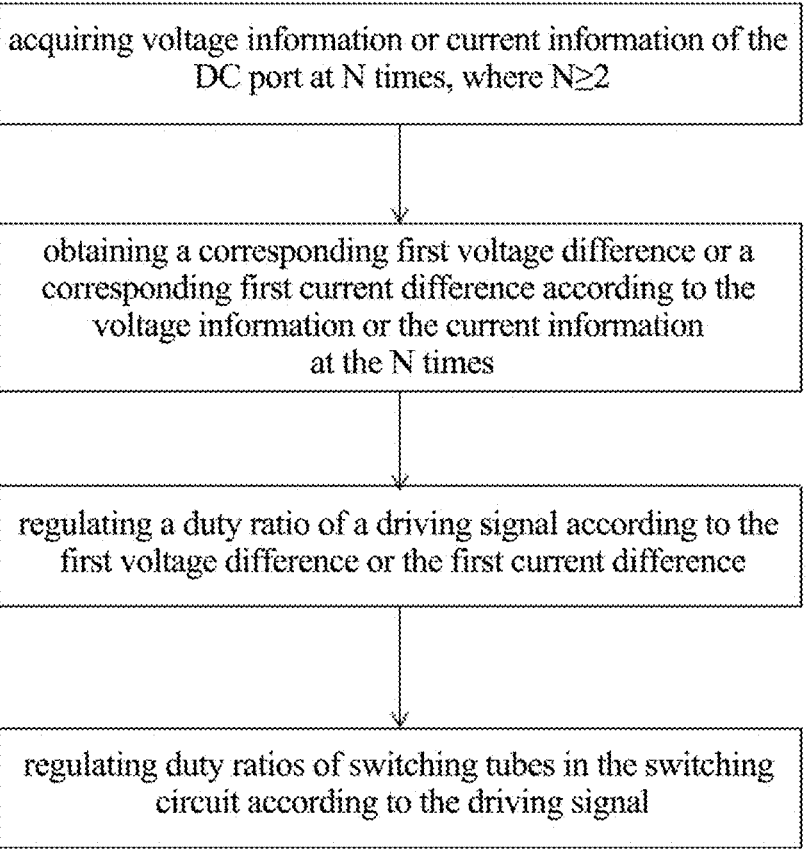
FIG. 3 is a flow diagram of a DC bias suppression method according to the present disclosure.
Figure 4A:
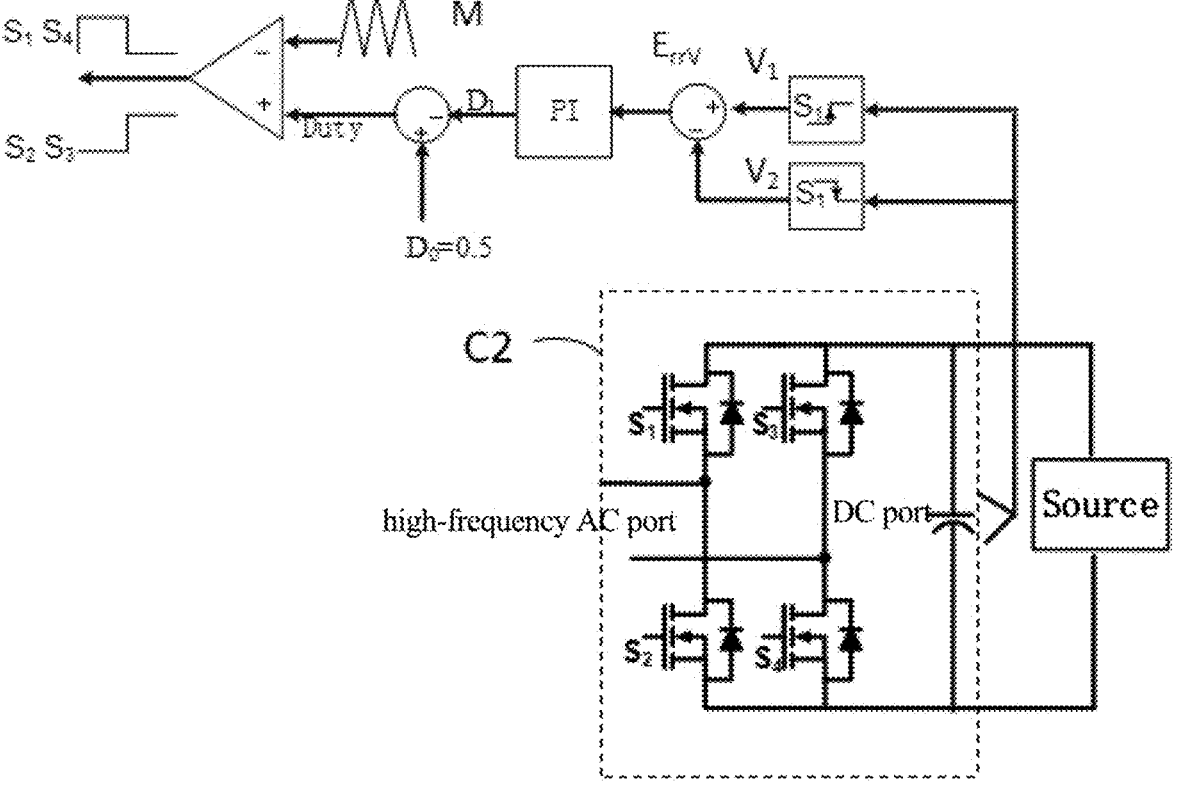
FIGS. 4A and 4B are schematic diagrams where the DC bias suppression method of the present disclosure is applied to a high-frequency power conversion circuit.
Figure 4B:
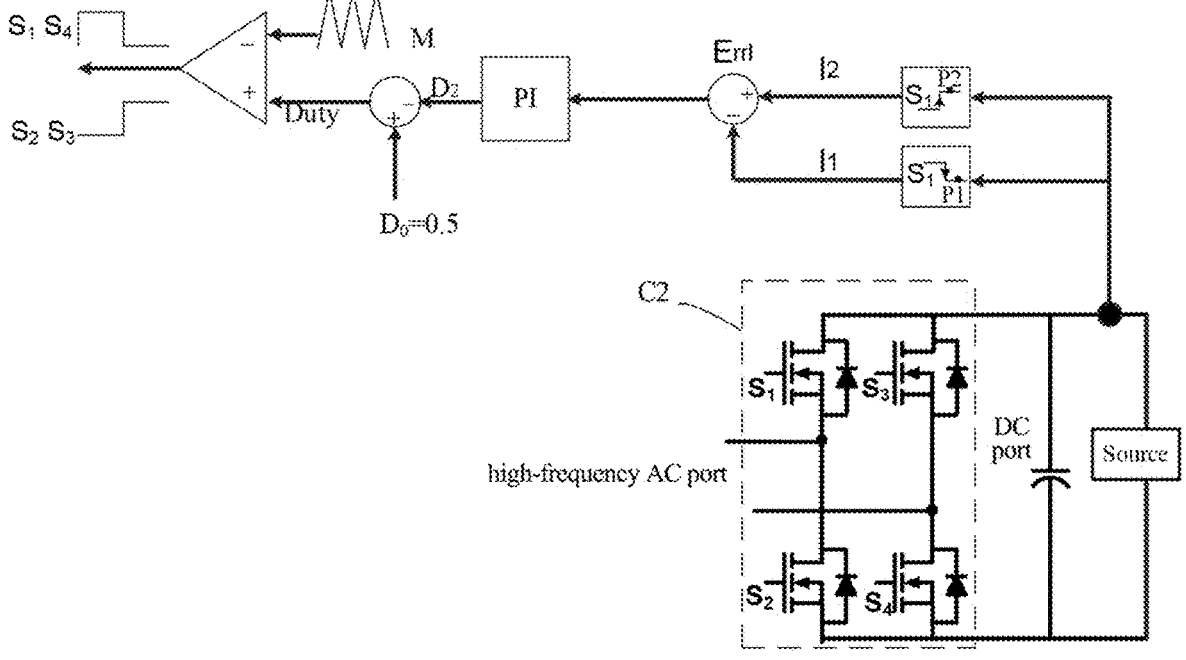

FIG. 3 is a flow diagram of a DC bias suppression method 100 according to the disclosure. The DC bias suppression method 100 is applied to a high-frequency power conversion circuit, as shown in FIGS. 4A and 4B, and the high-frequency power conversion circuit includes a high-frequency AC port, a switching circuit, a DC port and a power source connected sequentially. As shown in FIG. 3, the DC bias suppression method 100 includes:

acquiring voltage information or current information of the DC port at N times, where N≥2;

5 obtaining a corresponding first voltage difference or a first current difference according to the voltage information or the current information at the N times, and regulating a duty ratio of a driving signal according to the first voltage difference or the first current difference; and regulating duty ratios of switching tubes in the switching circuit according to the driving signal.

Hereinafter specific implementation of the DC bias suppression method 100 of the disclosure is explained combining with FIGS. 4A and 4B.

As shown in FIG. 4A, the high-frequency power conversion circuit C2 includes a high-frequency AC port, a switching circuit, a DC port and a power source connected sequentially, the switching circuit is a full-bridge circuit, and includes switching tubes $S_1$ to $S_4$, the switching tubes $S_1$ and $S_2$ are connected in series to form a first bridge arm, the switching tubes $S_3$ and $S_4$ are connected in series to form a second bridge arm, after connected in parallel, the first bridge arm and the second bridge arm are connected to the DC port, and central points of the first bridge arm and the second bridge arm are connected to the high-frequency AC port.

As shown in FIG. 4A, the high-frequency power conversion circuit C2 uses the DC bias suppression method 100 and a voltage sampling way, firstly, acquiring voltage information $V_1$ and $V_2$ of the DC port at a rising edge time $t_{up}$ and a falling edge time $t_{down}$ of the switching tube $S_1$; obtaining a corresponding first voltage difference $E_{nv}$ according to the voltage information $V_1$ and $V_2$, wherein the first voltage difference $E_{nv}$ is less than a voltage limit $E_{nVmax}$; outputting, via a P1 controller, a regulation result $D_1$ according to the first voltage difference $E_{nv}$, and then obtaining a duty ratio regulating value Duty according to the $D_1$ and a duty ratio $D_0$ of the original switching circuit to regulate a duty ratio of a driving signal M, where M is a triangular carrier wave, and "a duty ratio $D_0$ of the original switching circuit" refers to a duty ratio of the switching circuit when DC bias control is not performed, and may have a value of 0.5; and outputting the driving signal M to the switching tubes $S_1$ to $S_4$ in the switching circuit to regulate duty ratios of the switching tubes $S_1$ to $S_4$, thereby suppressing DC bias of the high-frequency AC port.

Specifically, when the first voltage difference $E_{nv}$ is greater than zero, the duty ratio of the driving signal is regulated to decrease, thereby decreasing the duty ratios of the switching tubes $S_1$ to $S_4$, and when the first voltage difference $E_{nv}$ is less than zero, the duty ratio of the driving signal is regulated to increase, thereby increasing the duty ratios of the switching tubes $S_1$ to $S_4$.

Figure 5:
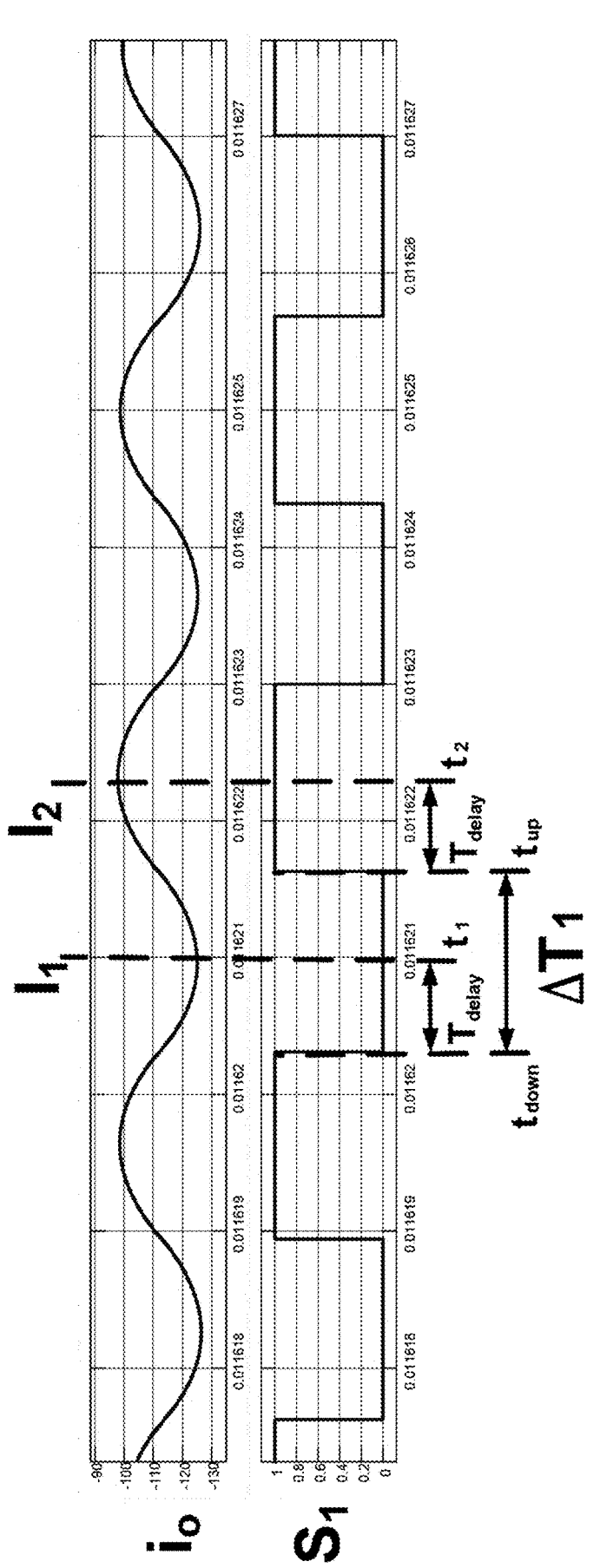
FIG. 5 is a schematic diagram of a sampling current according to one embodiment of the present disclosure.

The high-frequency power conversion circuit of FIG. 4B and the high-frequency power conversion circuit of FIG. 4A have the same structure, and the difference is that the high-frequency power conversion circuit of FIG. 4B uses a current sampling way when using the DC bias suppression method 100. Specifically, as shown in FIG. 5, a first sampling time $t_1$ is determined according to the falling edge time $t_{down}$ and a delay time $T_{delay}$ of the switching tube $S_1$ to acquire current information $I_1$ of the DC port, and a second sampling time $t_2$ is determined according to the rising edge time $t_{up}$ and the delay time $T_{delay}$ of the switching tube $S_1$ to acquire current information $I_2$ of the DC port. At this time, the delay time $T_{delay}$ shall be determined according to a model of the power source at a frequency fs, and a time interval of the rising edge time and the falling edge time of the switching tube is $\Delta T_1$. If the model is pure resistive, $T_{delay}=0$, if the model is resistor inductive,

6

$$0 < T_{delay} < \frac{\Delta T1}{2},$$

and if the model is resistor capacitive, $$\frac{3}{2}\Delta T_1 < T_{delay} < 2\Delta T1.$$

Continuing to refer to FIG. 4B, the corresponding current information $I_1$ at the first sampling time $t_1$ is the corresponding current information at a point P1, and the corresponding current information $I_2$ at the second sampling time $t_2$ is the corresponding current information at a point P2. A corresponding first current difference $E_{rrI}$ is obtained according to the acquired current information $I_1$ and 12, wherein the first current difference $E_{rrI}$ is less than a current limit $E_{rrImax}$, the P1 controller outputs a regulation result $D_2$ according to the first current difference $E_{rrI}$, and then obtains a duty ratio regulation value Duty according to the $D_2$ and a duty ratio $D_0$ of the original switching circuit C2 to regulate the duty ratio of the driving signal M, where M is a triangular carrier wave, and "a duty ratio Do of the original switching circuit" refers to a duty ratio of the switching circuit when DC bias control is not performed, and may have a value of 0.5, and the driving signal M is outputted to the switching tubes $S_1$ to $S_4$ in the switching circuit to regulate the duty ratios of the switching tubes $S_1$ to $S_4$, thereby suppressing DC bias of the high-frequency AC port.

Specifically, when the first current difference $E_{rrI}$ is greater than zero, the duty ratio of the driving signal is regulated to decrease, thereby decreasing the duty ratios of the switching tubes $S_1$ to $S_4$, and when the first current difference $E_{rrI}$ is less than zero, the duty ratio of the driving signal is regulated to increase, thereby increasing the duty ratios of the switching tubes $S_1$ to $S_4$.

Figure 1:
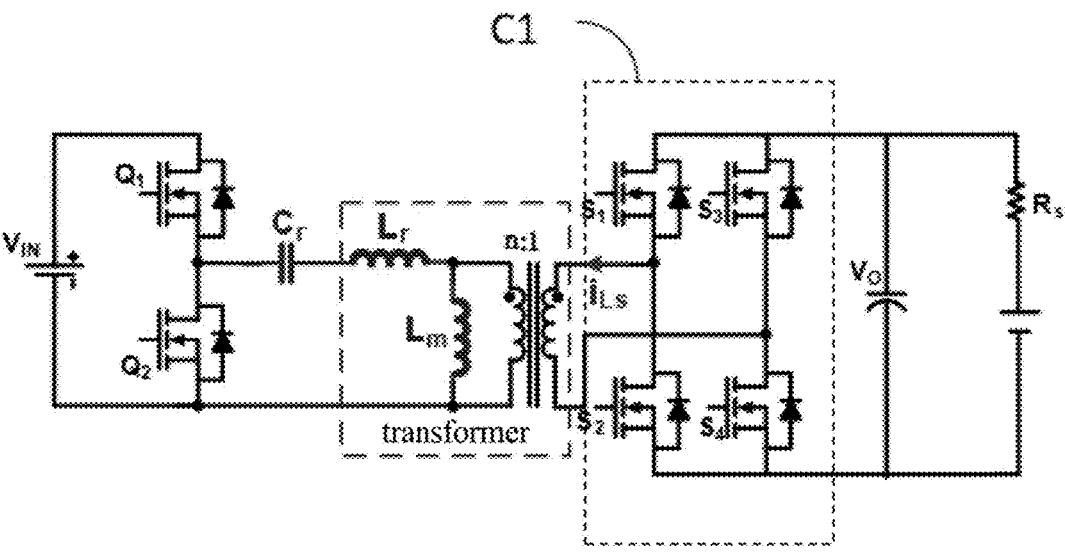
FIG. 1 is a schematic diagram of a LLC circuit in the prior art.
Figure 2:
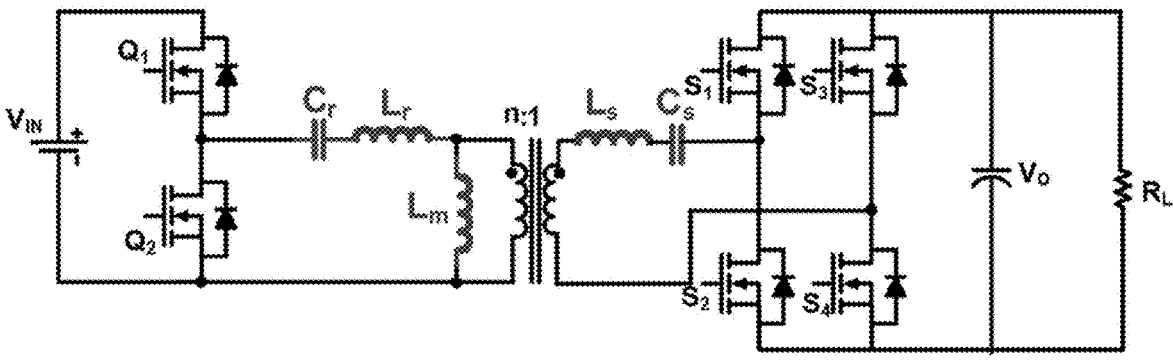
FIG. 2 is a schematic diagram of a CLLC circuit in the prior art.
Figure 6:
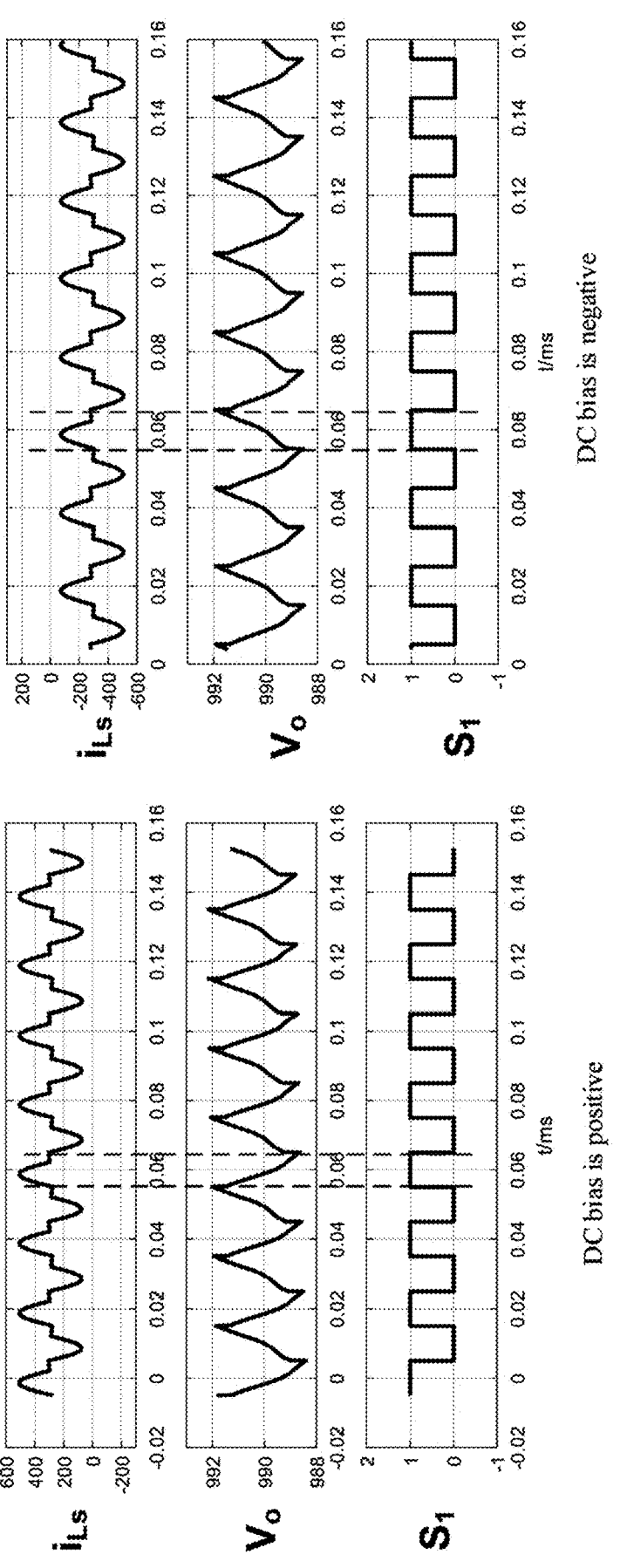
FIG. 6 is a waveform diagram when the LLC circuit of FIG. 1 has DC bias.

FIG. 6 is a waveform diagram when the LLC circuit of FIG. 1 has DC bias. Hereinafter the principle of the DC bias suppression method 100 of the disclosure is explained combining with FIGS. 1 and 6. As shown in FIG. 1, the LLC circuit includes a primary half-bridge circuit, a high-frequency transformer and a secondary circuit connected sequentially, the secondary circuit includes a high-frequency AC port, a switching circuit C1 and a DC port connected sequentially, the switching circuit C1 is a full-bridge circuit, and includes switching tubes $S_1$ to $S_4$, the switching tubes $S_1$ and $S_2$ are connected in series to form a first bridge arm, the switching tubes $S_3$ and $S_4$ are connected in series to form a second bridge arm, after connected in parallel, the first bridge arm and the second bridge arm are connected to the DC port, central points of the first bridge arm and the second bridge arm are connected to the high-frequency AC port, and a voltage of the DC port is Vo. Referring to FIG. 6, if iLs has a positive DC bias, at a high level interval of the switching tube $S_1$, power sent from Vo to a resonant cavity is large, such that Vo decreases in the interval, and it can be observed that Vo includes a switching frequency ripple leading ahead 90° of the waveform of $S_1$, and if $i_{Ls}$ has a negative DC bias, at the high level interval of $S_1$, power sent from Vo to the resonant cavity is small, such that Vo increases in the interval, and it can be observed that Vo includes a switching frequency ripple lagging behind 90° of the waveform of $S_1$.

According to the features, sampling is performed at the rising edge time $t_{up}$ and the falling edge time $t_{down}$ of the switching tube $S_1$ to acquire voltages $Vo(t_{up})$ and $Vo(t_{down})$ of the DC port, a difference $(\text{Vo}(t_{up})-\text{Vo}(t_{down}))$ between $\text{Vo}(t_{up})$ and $\text{Vo}(t_{down})$ is $E_{rrVo}$, and if $E_{rrVo}$ is greater than 0, it represents positive bias, and the duty ratio of the switching tubes $S_1$ and $S_4$ shall be reduced. Otherwise, the duty ratio of the switching tubes $S_1$ and $S_4$ is improved.

Control equation of the duty ratios of the switching tubes $S_1$ and $S_4$ is:

$$\text{Duty} = D_0 - \left(K_p + \frac{K_i}{s}\right)E_{rrVo} \qquad \text{Formula (1)}$$

where $D_0$ refers to the duty ratio of the switching circuit when DC bias control is not performed, i.e., the duty ratio of the original switching circuit, and is generally 0.5; $K_p$ and $K_i$ are proportional and integral coefficients of the P1 controller, the specific value is associated with model of the load, such that a control loop of the DC components is negative feedback, i.e., $K_p>0$, $E_{rrVo}<E_{rrmax}$, and $E_{rrmax}$ is the maximum allowable output ripple voltage. Meanwhile, in order to prevent the duty ratio from being regulated to be too large, $K_p*E_{rrmax}$ shall be less than 0.1, a recommendation of the proportional coefficient $K_p$ is $0.1/(E_{rrmax})$, and a recommendation of the integral coefficient $K_i$ is $0.01*K_p*fc$, where fc is a control frequency of the P1 controller.

Figure 7:
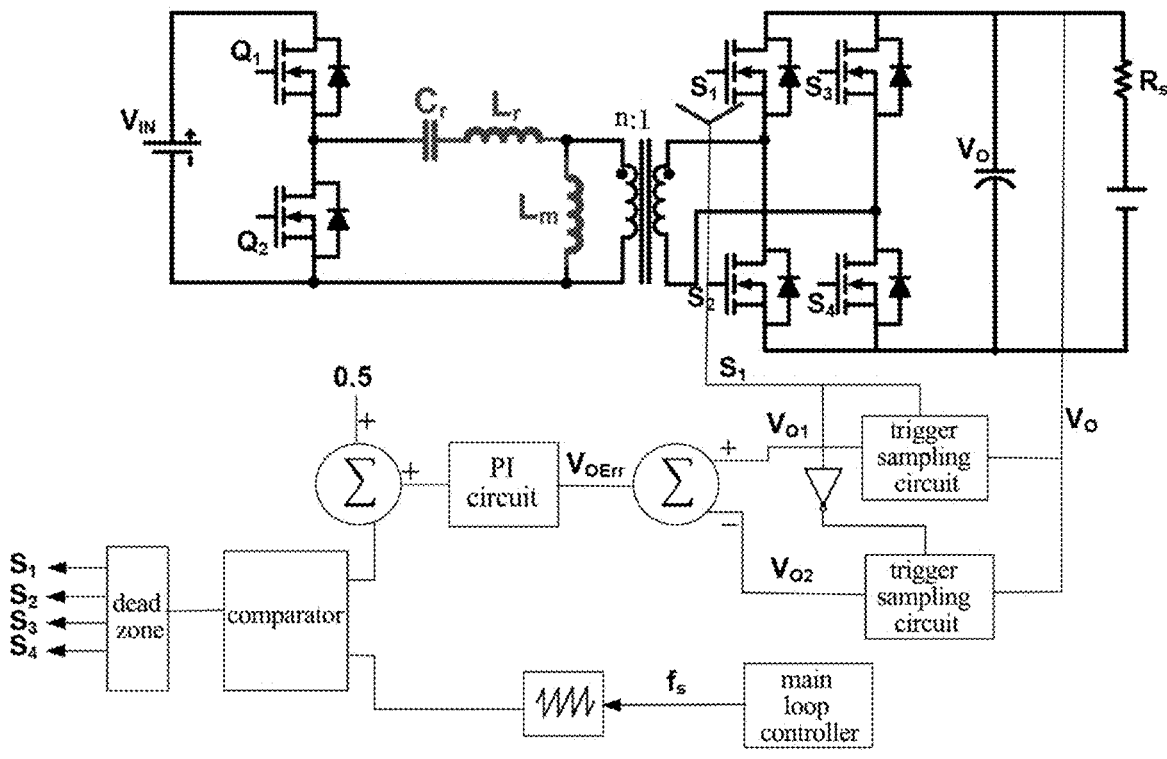
FIG. 7 is a schematic diagram of an analog circuit when a DC bias suppression method is applied to the LLC circuit of FIG. 1.

The DC bias suppression method of the disclosure can also be implemented by an analog circuit. As shown in FIG. 7, sampling is performed at the rising edge time and the falling edge time of the switching tube $S_1$ through a trigger sampling circuit to obtain two sampling voltages $V_{01}$ and $V_{02}$ of the DC port, a first voltage difference $V_{0Err}$ is obtained according to $V_{01}$ and $V_{02}$, $V_{0Err}$ is inputted into a P1 circuit, the obtained regulation result of the P1 circuit and the duty ratio (i.e., $D_0$, such as, the value is 0.5) of the original switching circuit are inputted into an adder to obtain the final regulation result, a duty ratio of a driving signal is regulated based on the final regulation result, and the driving signal is outputted to the switching tubes $S_1$ to $S_4$ to regulate duty ratios of the switching tubes $S_1$ to $S_4$, thereby suppressing DC bias of the high-frequency AC port.

In some embodiments, the number of sampling times in the DC bias suppression method 100 is 2, and amplitude limiting is performed on the obtained first voltage difference or the first current difference, but the sampling times are not limited to the rising edge time and the falling edge time of the switching tube $S_1$, and a time interval $\Delta T$ is a non-integer times of the switching period.

Figure 8:
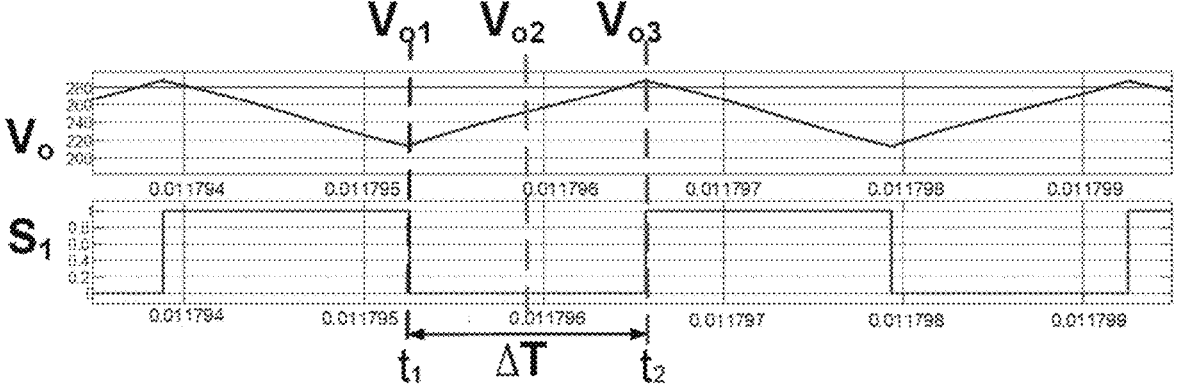
FIG. 8 is a schematic diagram of filtering sampling burrs according to one embodiment of the present disclosure.

FIG. 8 is a schematic diagram of filtering sampling burrs according to one embodiment of the disclosure. The method of filtering sampling burrs includes: performing N samplings within a time interval $\Delta T$ to obtain N sampling voltages, producing differences of the voltage information or the current information at every two adjacent times of the N times to obtain (N−1) second voltage differences or second current differences, and accumulating the (N−1) second voltage differences or second current differences to obtain the first voltage difference or the first current difference.

At this time, in the N samplings, a calculating formula of the second voltage difference at the two adjacent times is:

$$\Delta V_{Oi} = V_{O(i+1)} - V_{Oi} \quad i = 1, \ 2 \ldots \ N-1 \qquad \text{Formula (2)}$$

The corresponding first voltage difference at the sampling times $t_1$ and $t_2$ is:

$$E_{rrV} = \sum_{i=1}^{N-1}(\Delta V_{Oi}) \qquad \text{Formula (3)}$$

In this embodiment, when a value of N is 3, sampling voltages $V_{O1}$, $V_{O2}$ and $V_{O3}$ are obtained, respectively, and a value of i is 1 and 2. Suitable amplitude limiting on $\Delta V_{Oi}$ can have the effect of filtering the sampling burrs.

The number of sampling times in the DC bias suppression method 100 of the disclosure is not limited to two. In other embodiments, the DC bias suppression method 100 includes: acquiring voltage information or current information of the DC port at N times, where N>2; obtaining a corresponding first voltage difference or first current difference according to the voltage information or the current information at the N times; regulating a duty ratio of a driving signal according to the acquired first voltage difference or first current difference; and outputting the driving signal to the switching tubes in the switching circuit to regulate duty ratios of the switching tubes, thereby suppressing DC bias of the high-frequency AC port.

Figure 9:
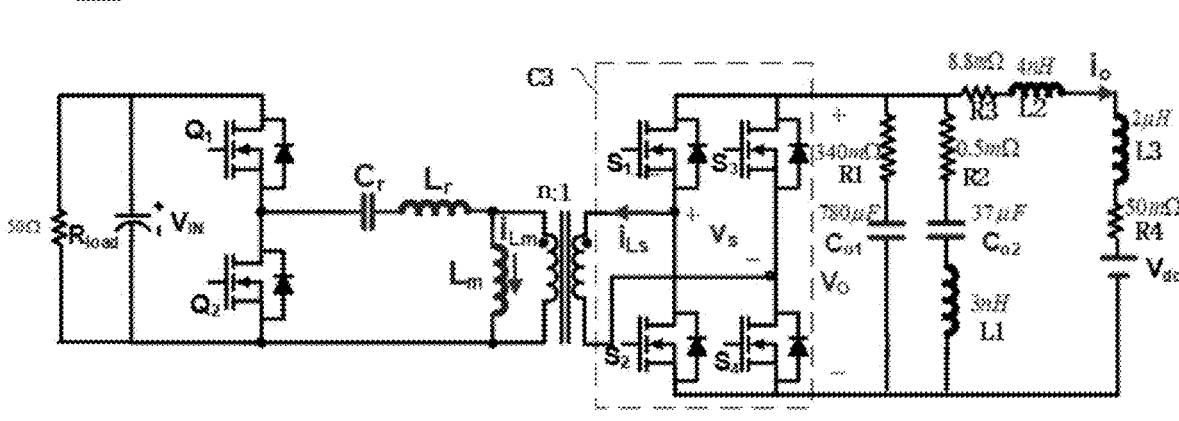
FIG. 9 is a schematic diagram of equivalent capacitance and inductance of a power source according to one embodiment of the present disclosure.

FIG. 9 is a schematic diagram of a LLC circuit 10 according to one embodiment of the disclosure, and the LLC circuit 10 includes a primary circuit, a high-frequency transformer and a secondary circuit connected sequentially. The switching tubes Q1 and Q2 are connected in series to form a half-bridge circuit disposed in the primary circuit, the secondary circuit includes a first side high-frequency circuit C3 including a high-frequency AC port, a switching circuit and a DC port connected sequentially, the high-frequency AC port is connected to a secondary winding of the high-frequency transformer, and the switching circuit is a full-bridge circuit. The switching tubes $S_1$ and $S_2$ are connected in series to form a first bridge arm, the switching tubes $S_3$ and $S_4$ are connected in series to form a second bridge arm, after connected in parallel, the first bridge arm and the second bridge arm are connected in parallel to a capacitor $C_{o1}$, a capacitor $C_{o2}$ and a battery $V_{dc}$, the capacitor $C_{o1}$ can be an electrolytic capacitor, the capacitor $C_{o2}$ can be a thinfilm capacitor, an equivalent parasitic parameter value of the capacitor $C_{o1}$ is 780 µF, an equivalent parasitic parameter value of the capacitor $C_{o2}$ is 72 µF, and the LLC circuit 10 is operated reversely to discharge the battery $V_{dc}$. Equivalent parasitic parameter values of other inductors or resistor devices, lines or batteries in the secondary circuit are shown in FIG. 9, where $R_{load}=50\Omega$, R1=340m$\Omega$, R2=0.5 m$\cap$, R3=8.8m$\Omega$, R4=50m$\Omega$, L1=3 nH, L2=4 nH, and L3=2 µH. Main parameters of the corresponding stimulation circuit of the LLC circuit 10 are fr=360e$^3$, Cr=16.5e$^{-9}$, Lr=11.7e$^{-6}$, Lm=20.1e$^{-6}$, $C_{o1}$=780e$^6$, $C_{o2}$=37e$^6$, and N=1.7, and control parameters of the LLC circuit 10 are $K_p$=0.001, and $K_i$=0.00001.

The LLC circuit 10 further includes a controller (not shown) configured for controlling a first side high-frequency circuit to perform the DC bias suppression method 100: acquiring voltage information or current information of the DC port at N times, where N≥2; obtaining a corresponding first voltage difference or first current difference according to the voltage information or current information at the N times, regulating a duty ratio of a driving signal according to the first voltage difference or the first current difference; and outputting the driving signal to the switching tubes $S_1$ to $S_4$ in the switching circuit to regulate duty ratios of the switching tubes $S_1$ to $S_4$, thereby suppressing DC bias of the high-frequency AC port.

Figure 10A:
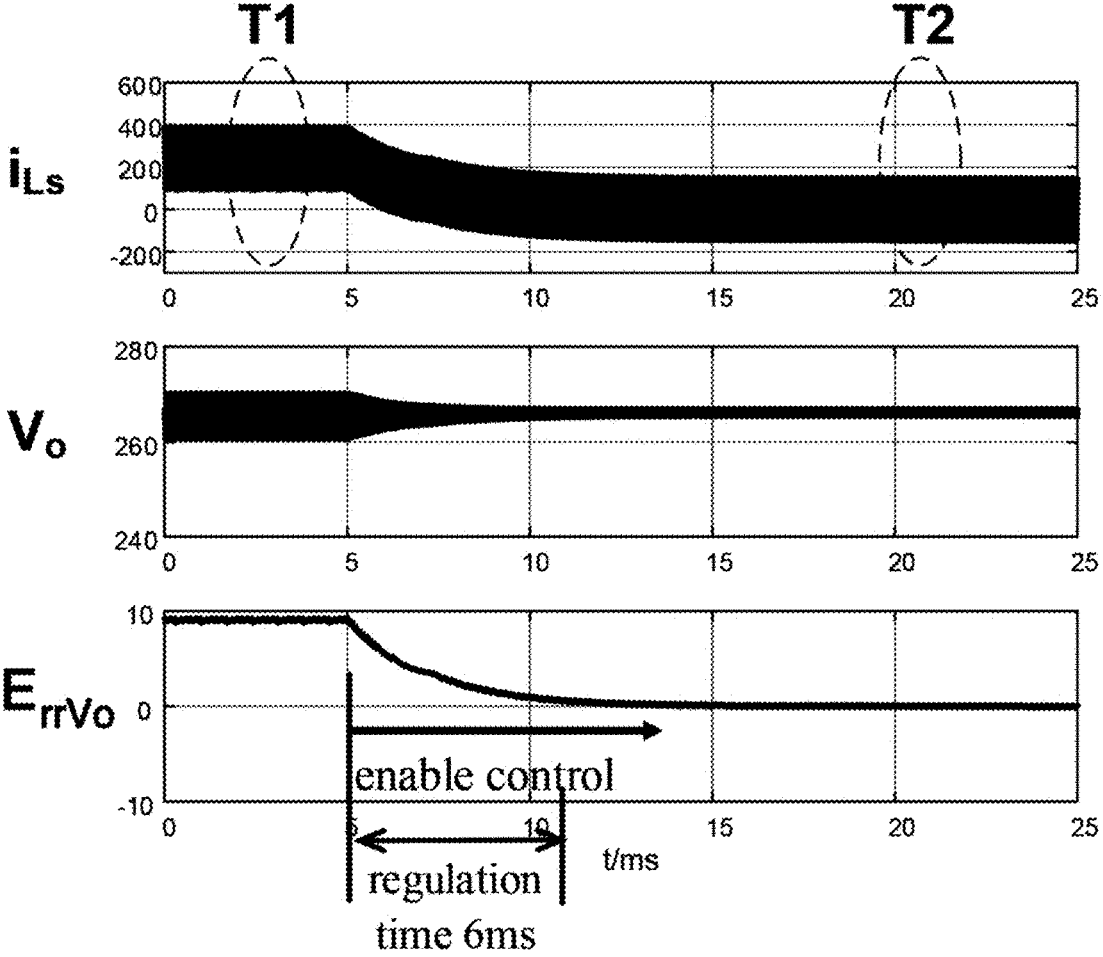
FIGS. 10A to 10C are diagrams of simulation results when the DC bias suppression method is applied to the LLC circuit of FIG. 9.
Figure 10B:
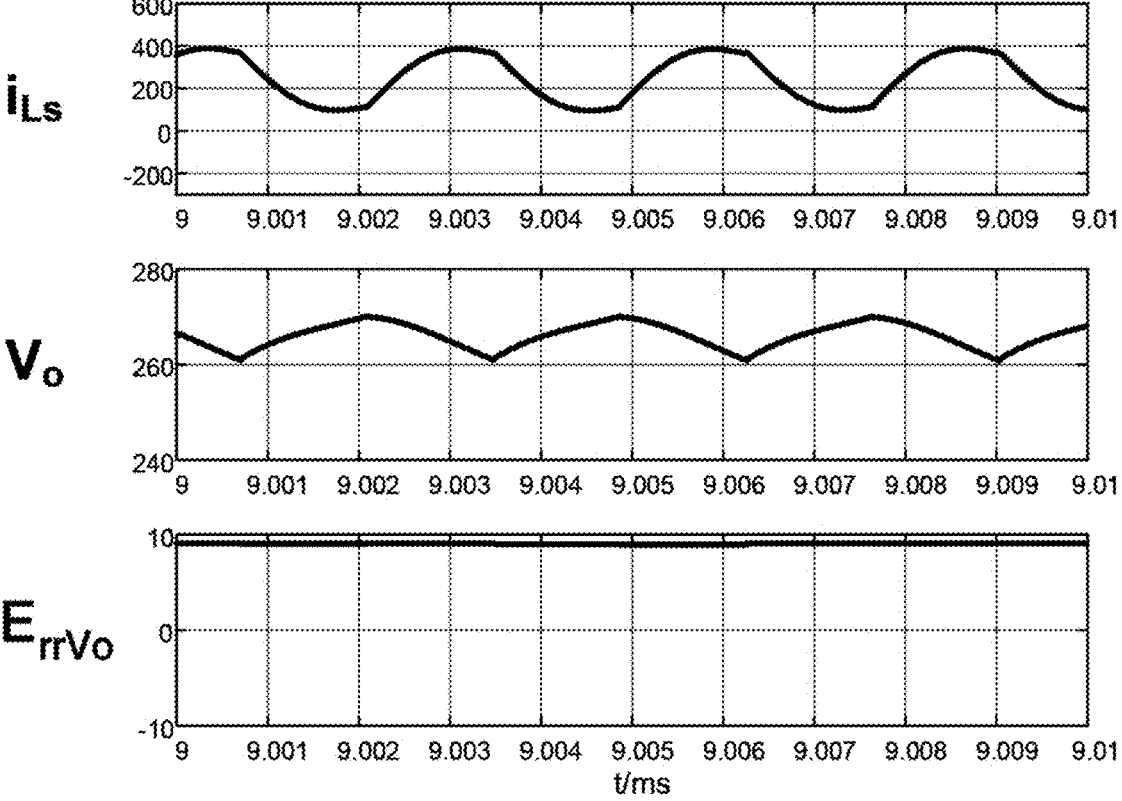
Figure 10C:
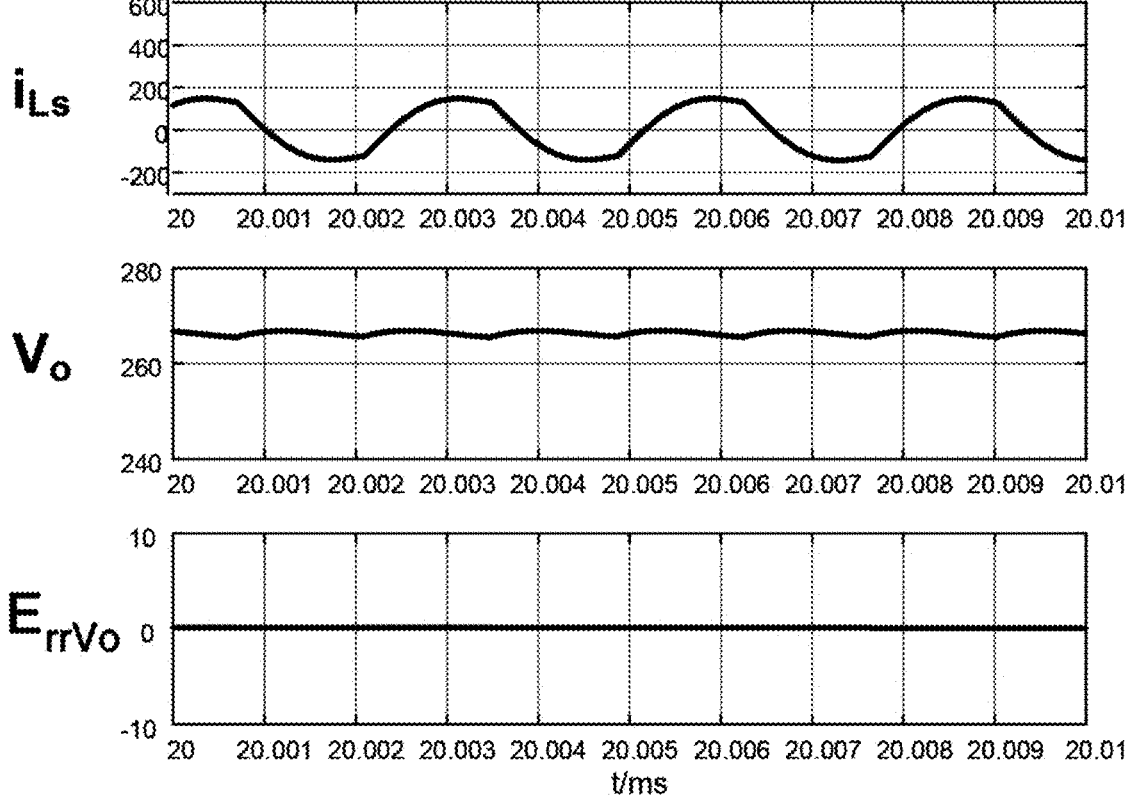

Simulation results when DC bias suppression of the disclosure is applied to the LLC circuit 10 are shown in FIGS. 10A to 10C. FIG. 10A shows a waveform diagram of a current ($I_{LS}$) of the high-frequency AC port, a voltage ($V_O$) of the DC port and a voltage difference ($E_{rrVo}$) of the LLC circuit 10, FIG. 10B is a waveform diagram of the current ($I_{LS}$) of the high-frequency AC port, the voltage ($V_O$) of the DC port and the voltage difference ($E_{rrVo}$) of the LLC circuit 10 during a first time period T1, and FIG. 10C is a waveform diagram of the current ($I_{LS}$) of the high-frequency AC port, the voltage ($V_O$) of the DC port and the voltage difference ($E_{rrVo}$) of the LLC circuit 10 during a second time period T2, where the first time period T1 is located before DC bias control, and the second time period T2 is located after DC bias control. As can be known from comparison between FIGS. 10B and 10C, after 6 ms enable regulation on the LLC circuit 10 using the DC bias suppression method 100 of the disclosure, the voltage difference ($E_{rrVo}$) is changed to zero, and DC bias of the high-frequency AC port is suppressed.

Figure 11:
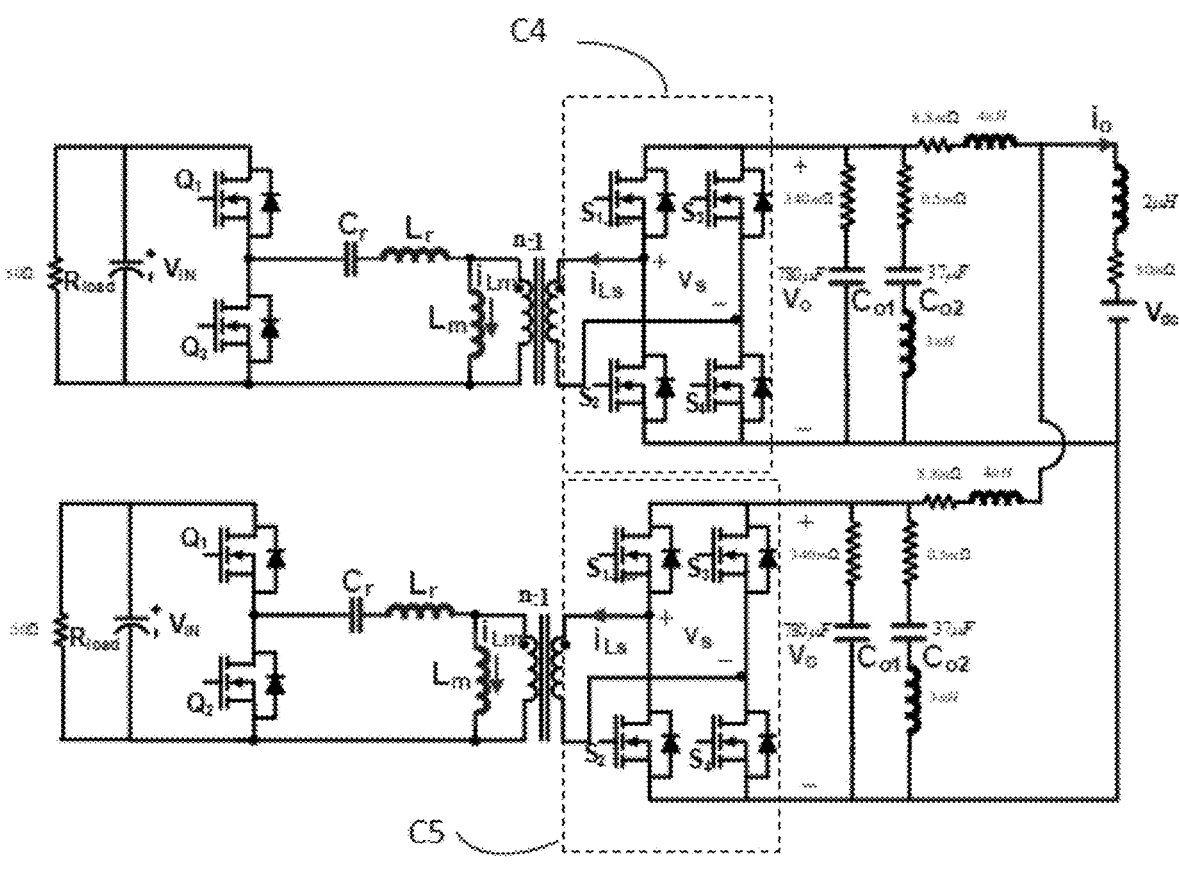
FIG. 11 is a schematic diagram of an output-parallel LLC circuit according to one embodiment of the present disclosure.

FIG. 11 is a schematic diagram of a LLC circuit 20 according to another embodiment of the disclosure. The LLC circuit 20 is a parallel LLC circuit, and includes a first LLC circuit and a second LLC circuit connected in parallel, the first LLC circuit includes a first primary circuit, a first resonant network, a first high-frequency transformer and a first secondary circuit, the second LLC circuit includes a second primary circuit, a second resonant network, a second high-frequency transformer and a second secondary circuit, and the first secondary circuit and the second secondary circuit are connected in parallel. The first resonant network is connected to a primary winding of the first high-frequency transformer, and includes a resonant capacitor Cr and a resonant inductor Lr, the first secondary circuit includes a first side high-frequency circuit C4 including a first high-frequency AC port, a first switching circuit and a first DC port connected sequentially, and the first high-frequency AC port is connected to a secondary winding of the first high-frequency transformer. The second resonant network is connected to a primary winding of the second high-frequency transformer, and includes a resonant capacitor Cr and a resonant inductor Lr, the second secondary circuit includes a first side high-frequency circuit C5 including a second high-frequency AC port, a second switching circuit and a second DC port connected sequentially, and the second high-frequency AC port is connected to a secondary winding of the second high-frequency transformer. A battery $V_{dc}$ is connected in parallel between the first secondary circuit and the second secondary circuit, the first LLC circuit and the second LLC circuit are connected in parallel to reversely operate to discharge the battery $V_{dc}$, and when connected in parallel, the lines have a certain impedance. As can be seen from the stimulation result of FIG. 13, due to the function of impedance of the lines, switching frequency fluctuation of the DC port voltages $V_{O1}$ and $V_{O2}$ of the first LLC circuit and the second LLC circuit substantially only reflects the individual DC bias, so the mutual influence is not big, and the DC bias suppression method 100 of the disclosure can be applied to the first LLC circuit and the second LLC circuit of the LLC circuit 20.

The LLC circuit 20 further includes a controller (not shown) configured for controlling the first side high-frequency circuits C4 and C5 to perform the DC bias suppression method 100:

acquiring voltage information or current information of the first DC port at N times, where N≥2; obtaining a corresponding first voltage difference or a first current difference according to the voltage information or the current information at the N times, regulating a duty ratio of a first driving signal according to the first voltage difference or the first current difference; and outputting the first driving signal to the switching tubes in the first switching circuit to regulate duty ratios of the switching tubes, thereby suppressing DC bias of the first high-frequency AC port;

acquiring voltage information or current information of the second DC port at N times, where N≥2; obtaining a corresponding first voltage difference or a first current difference according to the voltage information or the current information at the N times, regulating a duty ratio of a second driving signal according to the first voltage difference or the first current difference; and outputting the second driving signal to the switching tubes in the second switching circuit to regulate duty ratios of the switching tubes, thereby suppressing DC bias of the second high-frequency AC port.

Figure 12A:
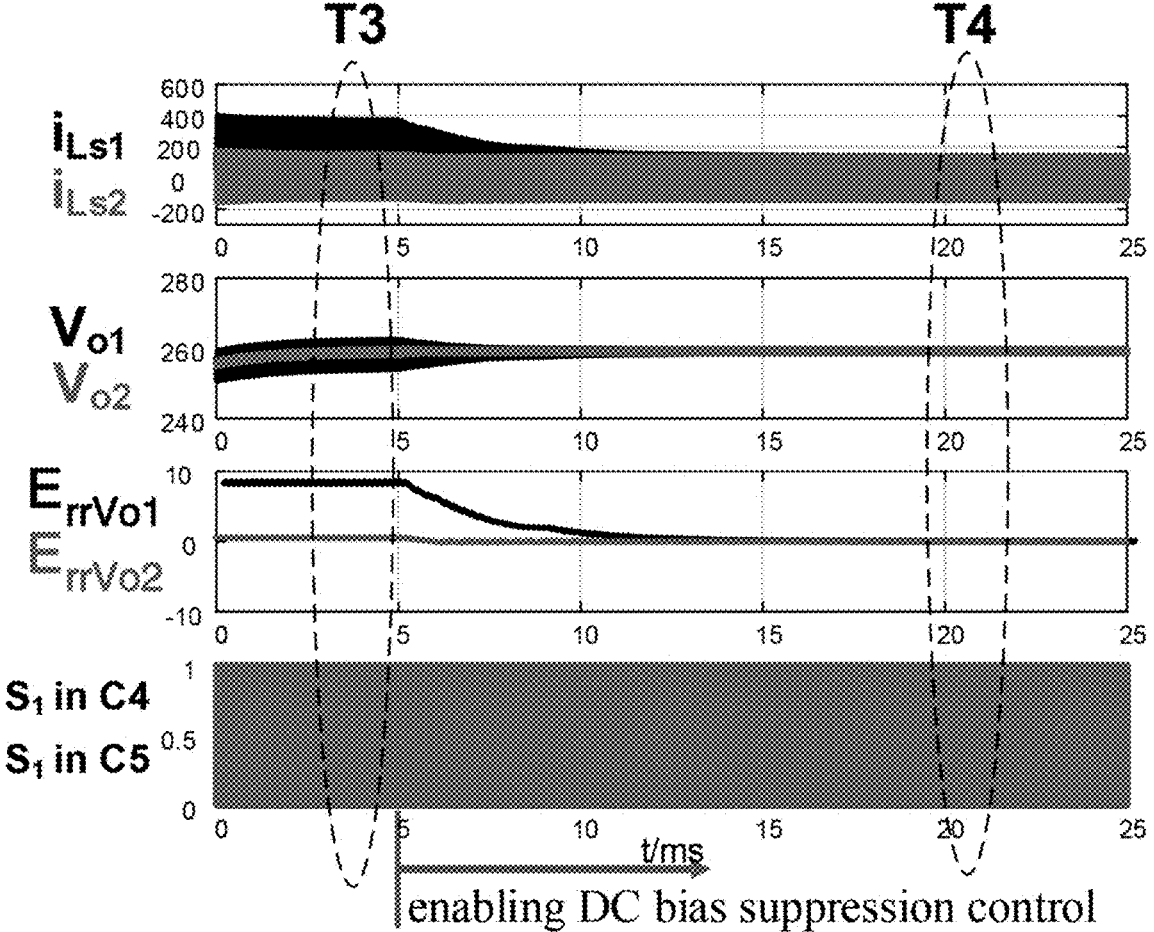
FIGS. 12A to 12C are diagrams of simulation results when the DC bias suppression method is applied to the LLC circuit of FIG. 11.
Figure 12B:
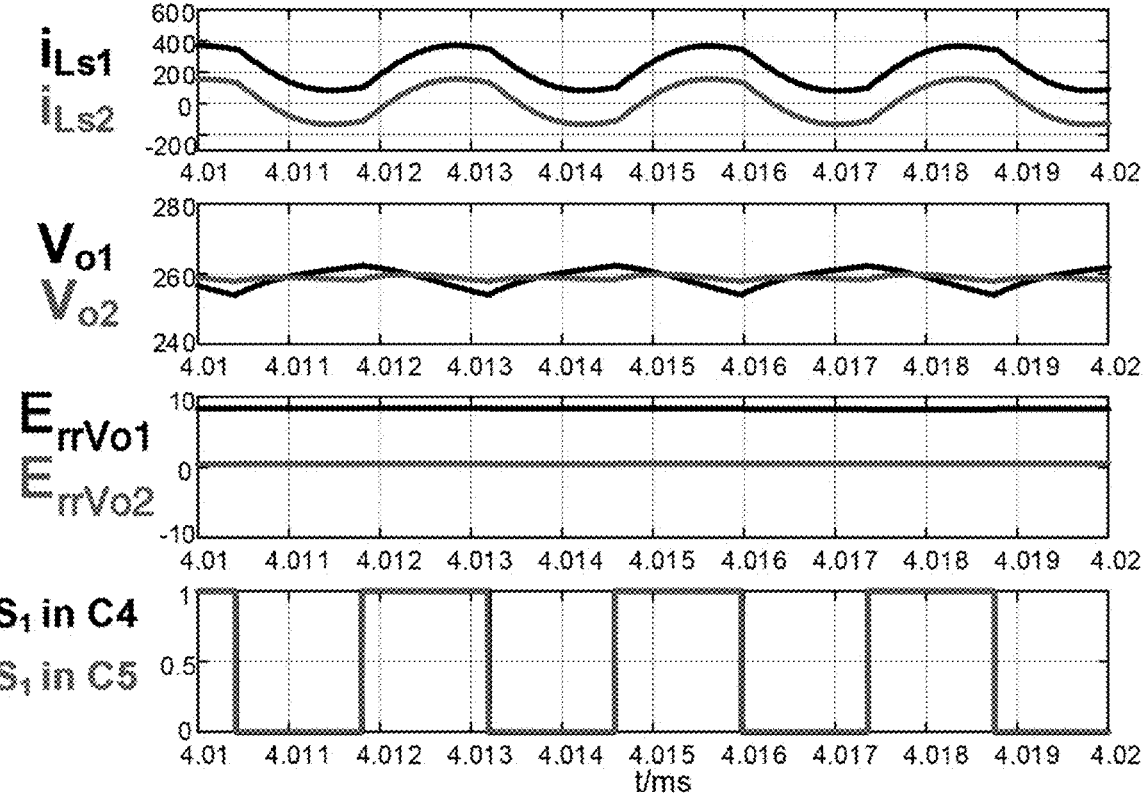
Figure 12C:
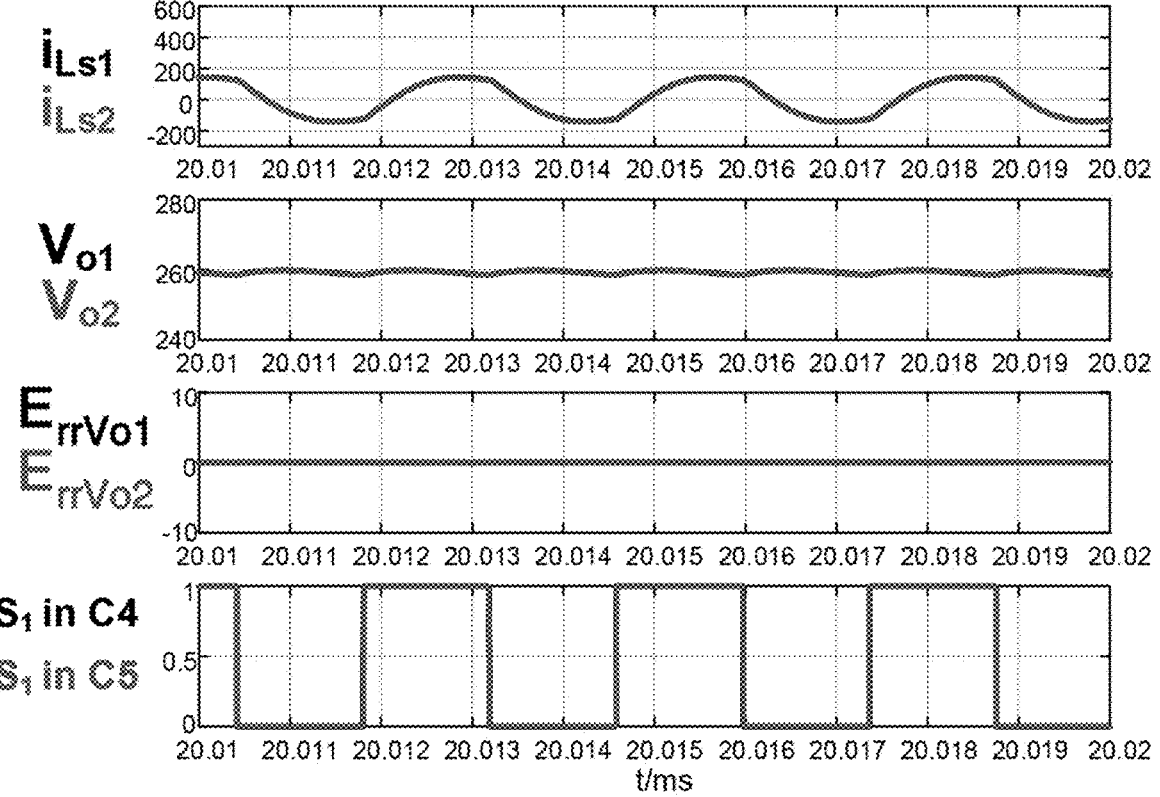

Stimulation results when DC bias suppression of the disclosure is applied to the LLC circuit 20 are shown in FIGS. 12A to 12C. FIG. 12A is a waveform diagram of currents ($i_{LS1}$, $i_{LS2}$) of the high-frequency AC ports, voltages ($V_{O1}$, $V_{O2}$) of the DC ports and voltage differences ($E_{rrVo1}$ and $E_{rrVo2}$) of the first side high-frequency circuit C4 and the first side high-frequency circuit C5, FIG. 12B is a waveform diagram of the currents ($i_{LS1}$, $i_{LS2}$) of the high-frequency AC ports, the voltages ($V_{O1}$, $V_{O2}$) of the DC ports and the voltage differences ($E_{rrVo1}$ and $E_{rrVo2}$) of the first side high-frequency circuit C4 and the first side high-frequency circuit C5 during a third time period T3, and FIG. 12C is a waveform diagram of the currents ($i_{LS1}$, $i_{LS2}$) of the high-frequency AC ports, the voltages ($V_{O1}$, $V_{O2}$) of the DC ports and the voltage differences ($E_{rrVo1}$ and $E_{rrVo2}$) of the first side high-frequency circuit C4 and the first side high-frequency circuit C5 during a fourth time period T4, where the third time period T3 is located before DC bias control, and the fourth time period T4 is located after DC bias control. As can be known from comparison between FIGS. 12B and 12C, after enable regulation using the DC bias suppression method of the disclosure, the voltage differences ($E_{rrVo1}$ and $E_{rrVo2}$) of the first side high-frequency circuit C4 and the first side high-frequency circuit C5 are changed to zero, and DC bias of the high-frequency AC ports of the first side high-frequency circuit C4 and the first side high-frequency circuit C5 is suppressed.

Figure 13:
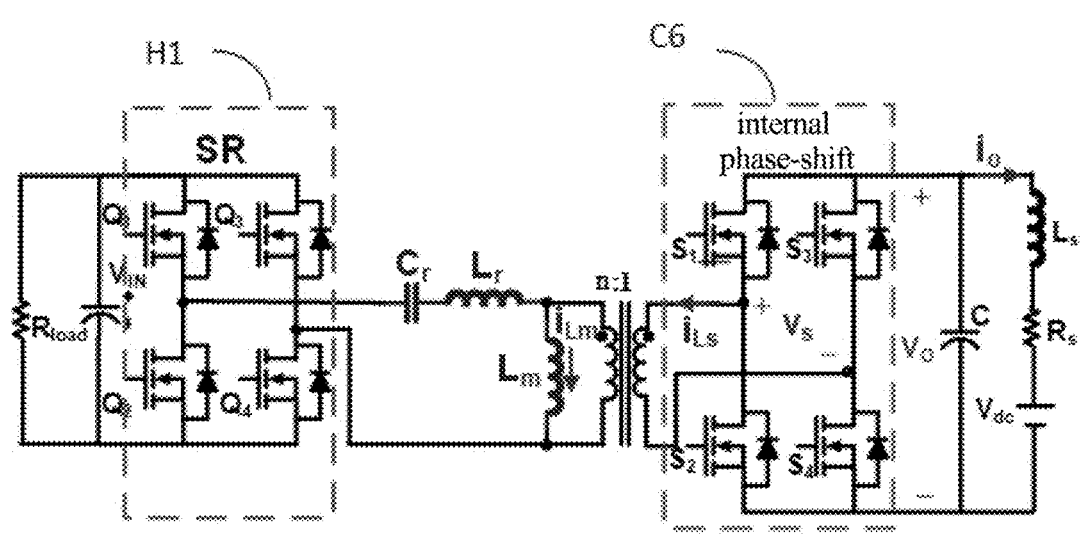
FIG. 13 is a schematic diagram of a phase-shift and voltage drop LLC circuit according to one embodiment of the present disclosure.

FIG. 13 is a schematic diagram of a LLC circuit 30 according to another embodiment of the disclosure, and the LLC circuit 30 includes a primary circuit, a high-frequency transformer and a secondary circuit connected sequentially. The primary circuit includes a full-bridge circuit H1 including a third bridge arm formed by switching tubes Q1 and Q2 connected in series and a fourth bridge arm formed by switching tubes Q3 and Q4 connected in series, wherein the third bridge arm and the fourth bridge arm are connected in parallel, and a resonant network including a resonant capacitor Cr and a resonant inductor Lr, and connected to a primary winding of the high-frequency transformer. The secondary circuit includes a first side high-frequency circuit C6 including a high-frequency AC port, a switching circuit and a DC port connected sequentially, the high-frequency AC port is connected to a secondary winding of the high-frequency transformer, the switching circuit is a full-bridge circuit, and includes a first bridge arm formed by switching tubes $S_1$ and $S_2$ connected in series and a second bridge arm formed by switching tubes $S_3$ and $S_4$ connected in series, and the first bridge arm and the second bridge arm are connected in parallel. The LLC circuit 30 is reversely operated to discharge the battery $V_{dc}$, and conduction angles of the first bridge arm and the second bridge arm of the switching circuit differ by one phase to adjust the phase, thereby achieving phase-shift control, and voltage drop through the way of internal phase-shift of the first bridge arm and the second bridge arm.

When reversely operated, the traditional CLLC circuit has voltage drop through the way of internal phase-shift of the bridge arm of the secondary circuit, and as compared to frequency modulation voltage drop, a wider range voltage drop can be achieved, but there is a problem that the lagging bridge arm is prone to not satisfying the conditions of zero voltage switch (ZVS). If the LLC is reversely operated directly, since the secondary circuit does not have a capacitor, currents at the turn-on time of the leading bridge arm and the lagging bridge arm are the same, and the problem that the lagging bridge arm is prone to not satisfying the conditions of zero voltage switch (ZVS) does not exist, which facilitates enhancing efficiency of reverse operation.

The LLC circuit 30 further includes a controller (not shown) configured for controlling the first side high-frequency circuit C6 to perform the DC bias suppression method 100: acquiring voltage information or current information of the DC port at N time, where N≥2; obtaining a corresponding first voltage difference or a first current difference according to the voltage information or the current information at the N times, regulating a duty ratio of a driving signal according to the first voltage difference or the first current difference; and outputting the driving signal to the switching tubes $S_1$ to $S_4$ in the switching circuit to regulate duty ratios of the switching tubes $S_1$ to $S_4$, thereby suppressing DC bias of the high-frequency AC port.

Figure 14A:
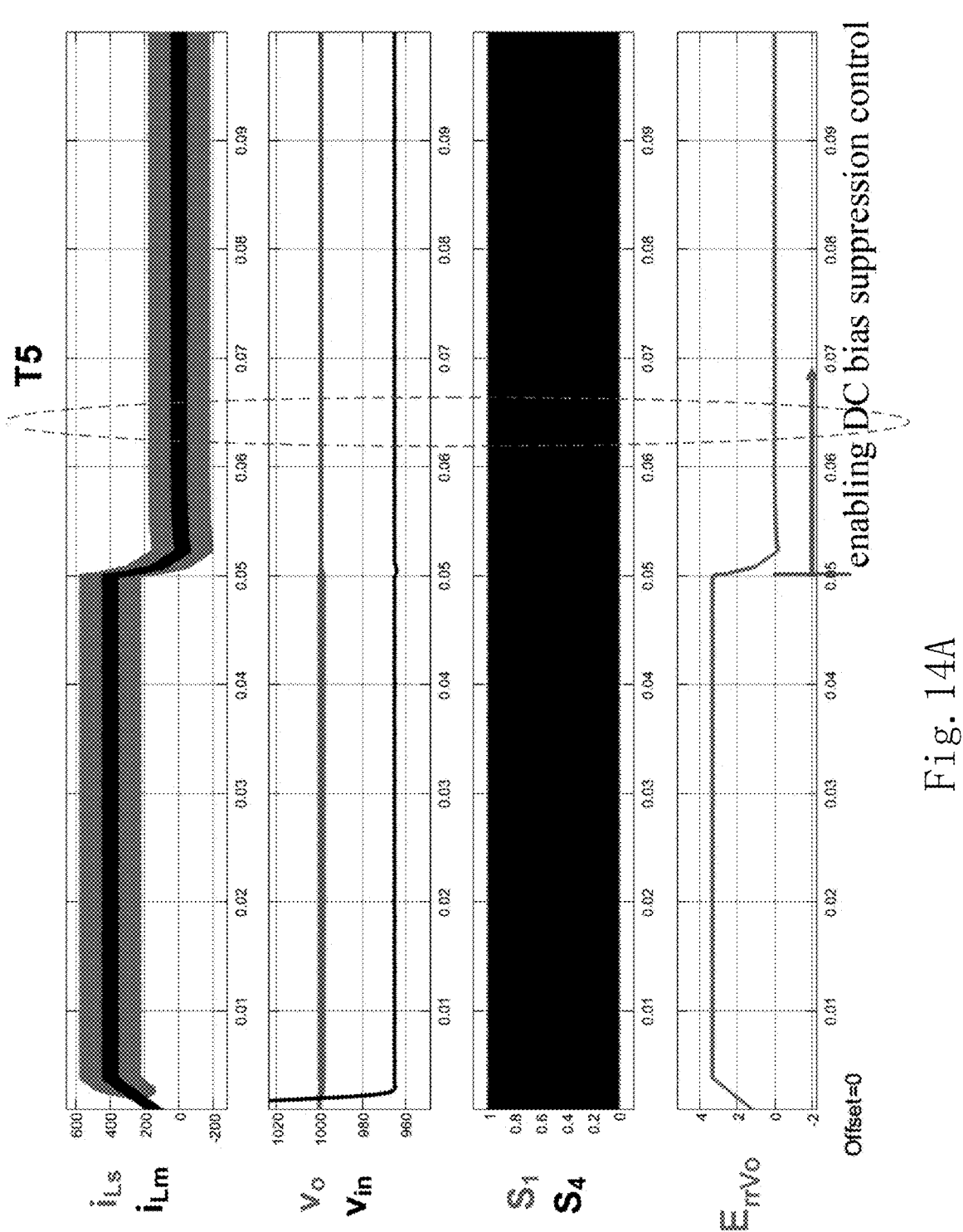
FIGS. 14A to 14B are diagrams of simulation results when the DC bias suppression method is applied to the LLC circuit of FIG. 13.
Figure 14B:
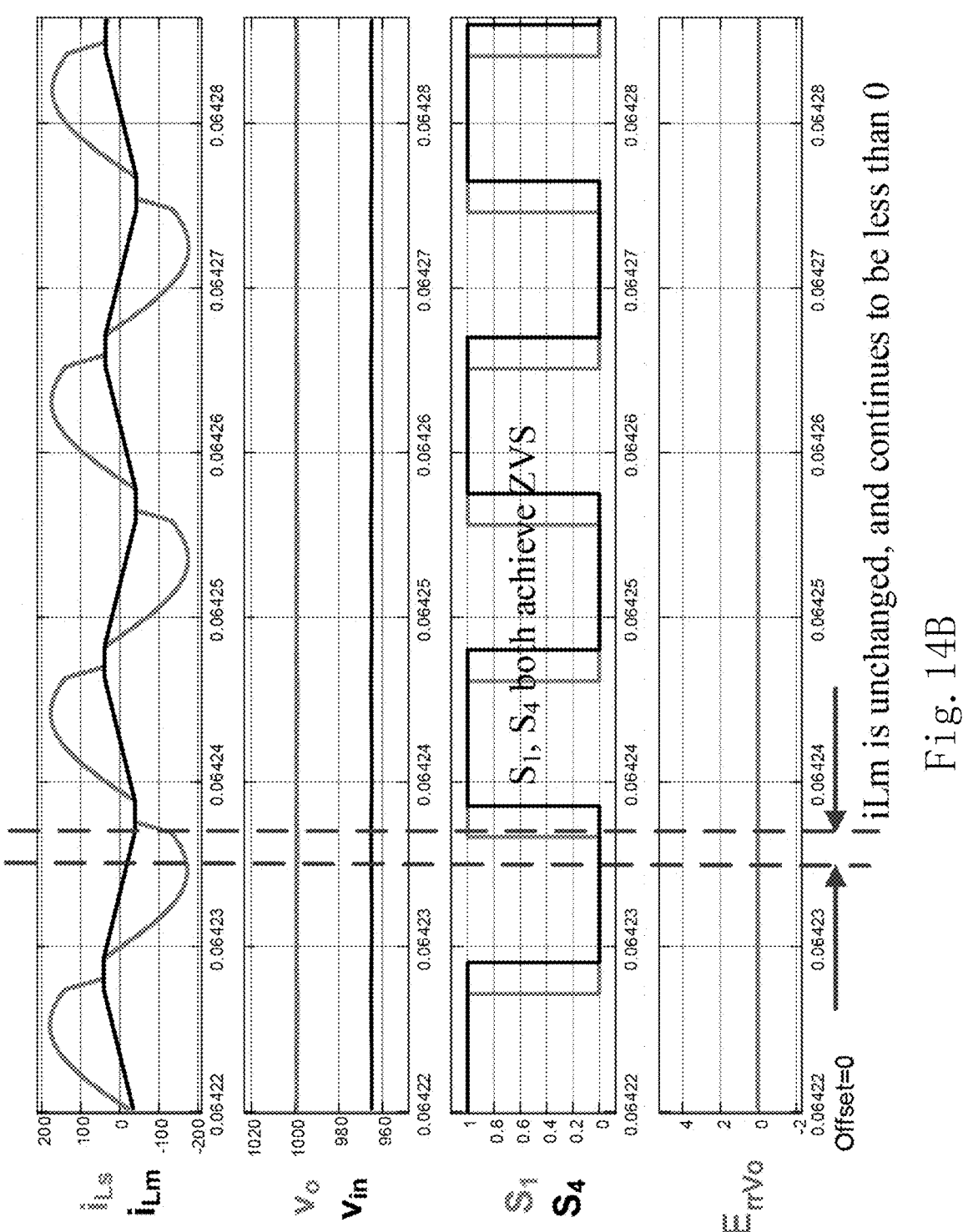

Stimulation results when the DC bias suppression method of the disclosure is applied to the LLC circuit 30 are shown in FIGS. 14A and 14B. FIG. 14A shows a waveform diagram of a current ($I_{LS}$) of the high-frequency AC port, a current $i_m$ flowing an excitation inductor $L_m$, a DC port voltage ($V_O$) and an input voltage ($V_{in}$), a voltage at both ends of the switching tubes $S_1$ and $S_4$ and a voltage difference ($E_{rrVo}$) of the first side high-frequency circuit C6, FIG. 14B is a waveform diagram of the current ($I_{LS}$) of the high-frequency AC port, the current $i_m$ flowing the excitation inductor $L_m$, the DC port voltage ($V_O$) and the input voltage ($V_{in}$), the voltage at both ends of the switching tubes $S_1$ and $S_4$ and the voltage difference ($E_{rrVo}$) of the first side high-frequency circuit C6 during a fifth time period T5, and the fifth time period T5 is a time period after DC bias control. After enable regulation using the DC bias suppression method of the disclosure, DC bias of the high-frequency AC port is suppressed, and before and after DC bias control, $i_m$ is unchanged, and continues to be less than zero, and the switching tubes $S_1$ and $S_4$ can achieve zero voltage switch.

Figure 15:
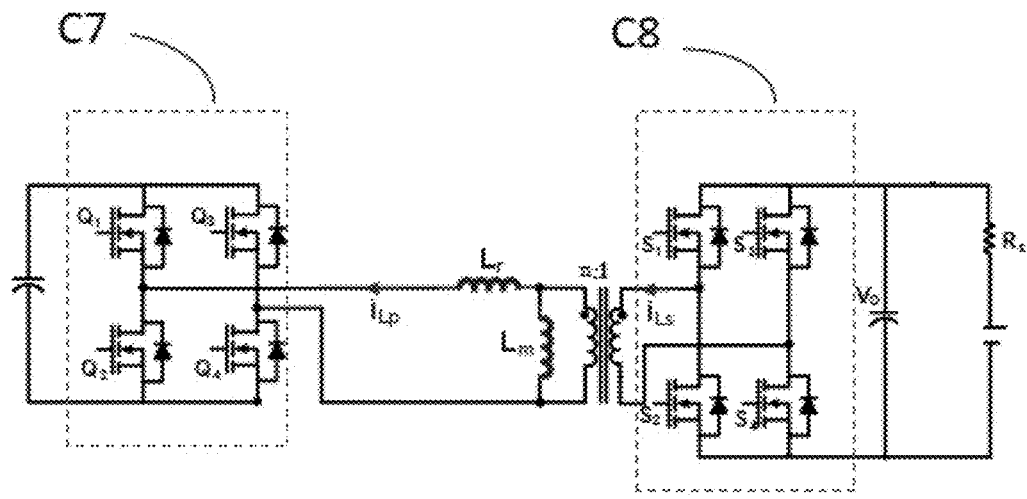
FIG. 15 is a schematic diagram of a bidirectional active full-bridge circuit according to one embodiment of the present disclosure.

FIG. 15 is a schematic diagram of a bidirectional active full-bridge (DAB) circuit 40 according to one embodiment of the disclosure. The bidirectional active full-bridge (DAB) circuit 40 includes a primary circuit, a high-frequency transformer and a secondary circuit, the primary circuit includes a second side high-frequency circuit C7 including a second DC port, a second switching circuit and a second high-frequency AC port connected sequentially, and a passive network including an inductor Lr and connected to a primary winding of the transformer, and the second switching circuit is a full-bridge circuit, and includes switching tubes Q1 to Q4. The secondary circuit includes a first side high-frequency circuit C8 including a first high-frequency AC port, a first switching circuit and a first DC port connected sequentially, the first high-frequency AC port is connected to a secondary winding of the high-frequency transformer, and the second switching circuit is a full-bridge circuit, and includes switching tubes $S_1$ to $S_4$. Stimulation parameters of the bidirectional active full-bridge circuit 40 are as follows: fs=50e³, Lr=2e⁻⁵, $L_m$=4e⁴, N=1, Kp=0.001, and Ki=0.00001.

The bidirectional active full-bridge circuit 40 further includes a controller for controlling the second side high-frequency circuit C7 and the first side high-frequency circuit C8 to perform the DC bias suppression method 100:
acquiring voltage information or current information of the second DC port at N times, where N≥2; obtaining a corresponding third voltage difference or a third current difference according to the voltage information or the current information at the N times, regulating a duty ratio of a second driving signal according to the third voltage difference or the third current difference; and outputting the second driving signal to the switching tubes Q1 to Q4 in the second switching circuit to regulate duty ratios of the switching tubes Q1 to Q4, thereby suppressing DC bias of the second high-frequency AC port;
acquiring voltage information or current information of the first DC port at N times, where N≥2; obtaining a corresponding first voltage difference or a first current difference according to the voltage information or the current information at the N times, regulating a duty ratio of a first driving signal according to the first voltage difference or the first current difference; and outputting the first driving signal to the switching tubes $S_1$ to $S_4$ in the first switching circuit to regulate duty ratios of the switching tubes $S_1$ to $S_4$, thereby suppressing DC bias of the first high-frequency AC port.

Figure 16A:
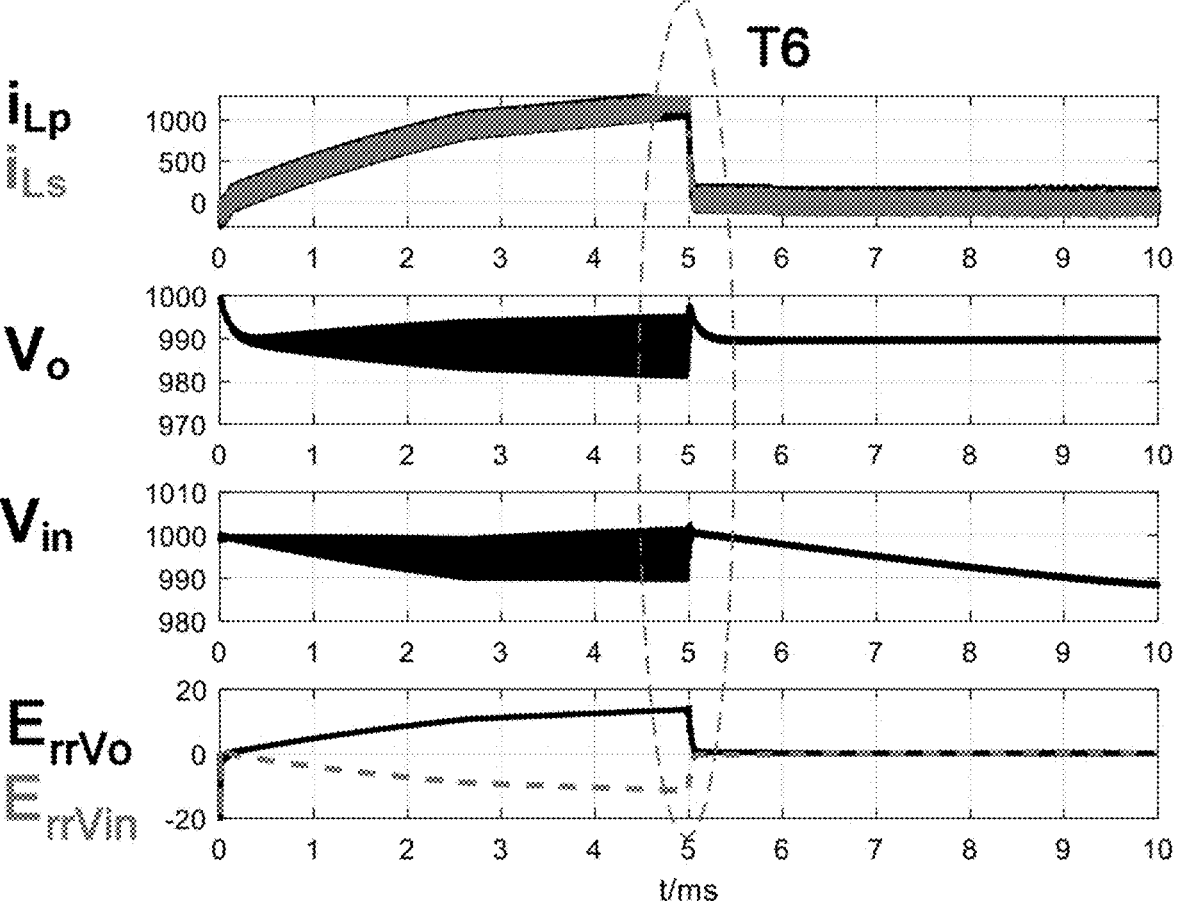
FIGS. 16A to 16B are diagrams of simulation results when the DC bias suppression method is applied to the bidirectional active full-bridge circuit of FIG. 15.
Figure 16B:
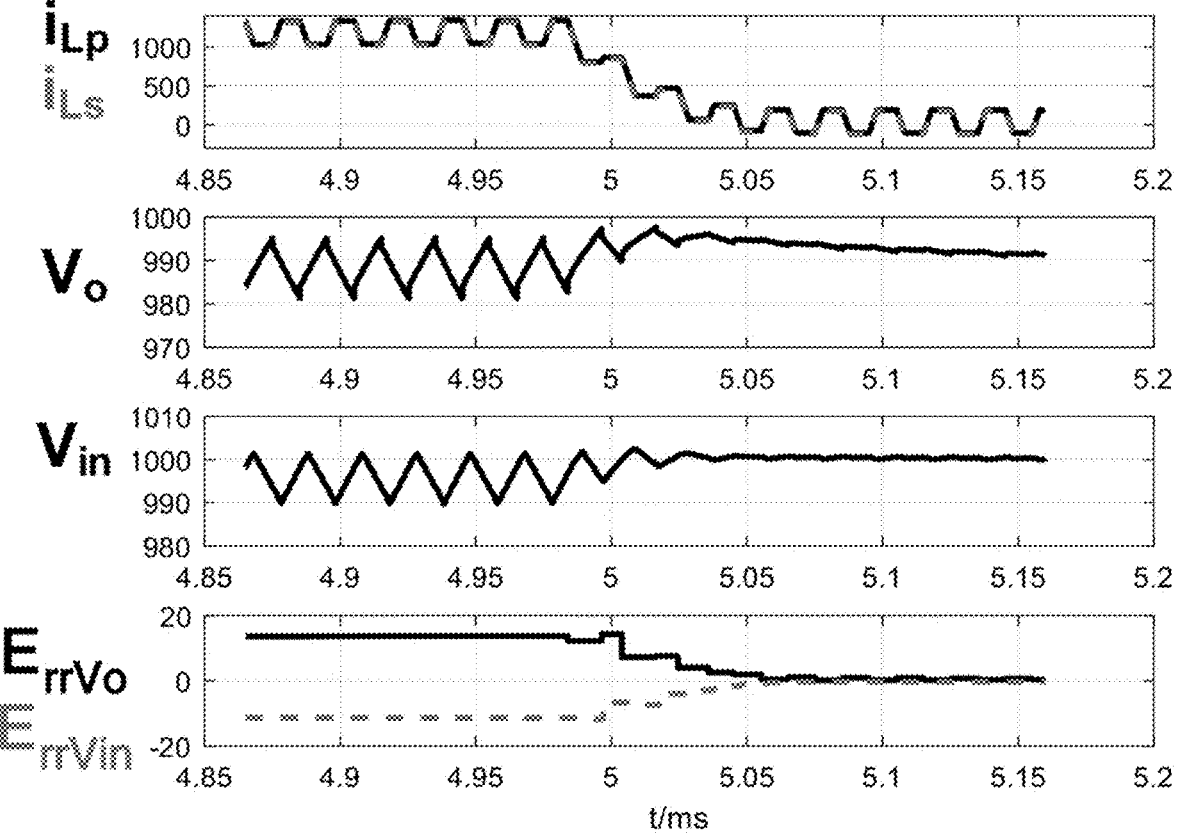

Stimulation results when the DC bias suppression method of the disclosure is applied to the bidirectional active full-bridge circuit 40 are shown in FIGS. 16A to 16B. FIG. 16A shows a waveform diagram of a sampling voltage $V_{in}$ of the second DC port, a current $i_{LP}$ of the second high-frequency AC port, a voltage difference $E_{rrVin}$, a sampling voltage $V_O$ of the first DC port, a current $i_{LS}$ of the first high-frequency AC port and a voltage difference $E_{rrVo}$, FIG. 16B is a waveform diagram of the sampling voltage $V_{in}$ of the second DC port, the current $i_{LP}$ of the second high-frequency AC port, the voltage difference $E_{rrVin}$, the sampling voltage $V_O$ of the first DC port, the current $i_{LS}$ of the first high-frequency AC port and the voltage difference $E_{rrVo}$ during a time period T6, and the time period T6 includes a starting time of the DC bias control. After enable regulation using the DC bias suppression method of the disclosure, DC bias in the $i_{LP}$ of the second high-frequency AC port and DC bias in the $i_{LS}$ of the first high-frequency AC port are suppressed.

In other embodiments, the number of the first side high-frequency circuit and the second side high-frequency circuit is not limited to one, and when the number of the first side high-frequency circuit and the second side high-frequency circuit in the circuit is multiple, output sides of the first DC ports of the multiple first side high-frequency circuits are connected in parallel.

Figure 17:
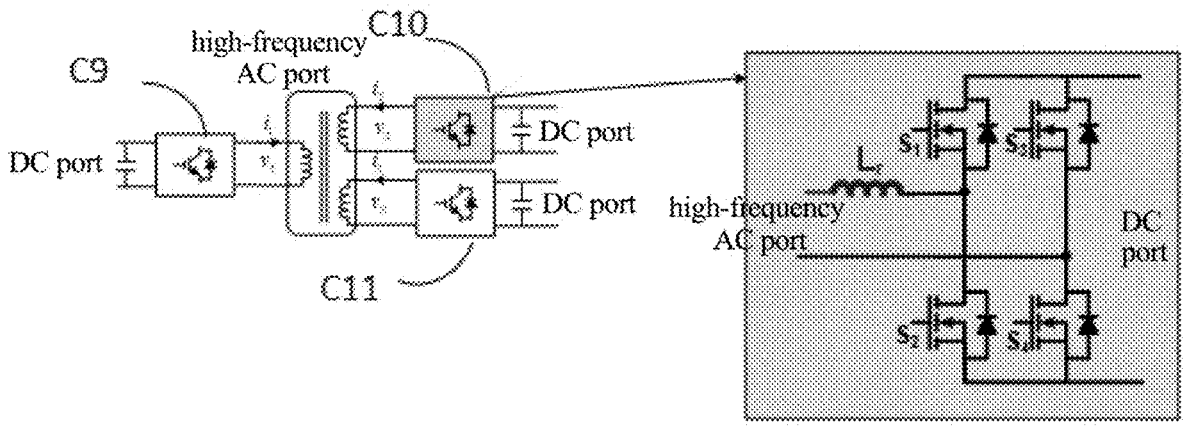
FIG. 17 is a schematic diagram of a three-port circuit according to one embodiment of the present disclosure.

FIG. 17 is a schematic diagram of a three-port circuit 50 according to one embodiment of the disclosure. The three-port circuit 50 includes a primary circuit, a high-frequency transformer, a first secondary circuit and a second secondary circuit. The primary circuit includes a second side high-frequency circuit C9 including a DC port, a switching circuit and a high-frequency AC port connected sequentially, the first secondary circuit includes a first side high-frequency circuit C10 including a first high-frequency AC port, a first switching circuit and a first DC port connected sequentially, the second secondary circuit includes a first side high-frequency circuit C11 including a second high-frequency AC port, a second switching circuit and a second DC port connected sequentially, and the high-frequency transformer is a multi-winding transformer, where a secondary side includes a plurality of windings. The high-frequency AC port is connected to a primary winding of the high-frequency transformer, and the first high-frequency AC port and the second high-frequency AC port are connected to a secondary winding of the high-frequency transformer, respectively. The first high-frequency AC port and the second high-frequency AC port can also be connected to one secondary winding of the high-frequency transformer through a passive network, and the passive network includes an inductor. In other embodiments, the passive network includes an inductor and a capacitor.

The three-port circuit 50 further includes a controller (not shown) for controlling the second side high-frequency circuit C9, the first side high-frequency circuit C10 and the first side high-frequency circuit C11 to perform the DC control method 100:

acquiring voltage information or current information of the DC port at N times, where N≥2; obtaining a corresponding third voltage difference or a third current difference according to the voltage information or the current information at the N times, regulating a duty ratio of a driving signal according to the third voltage difference or the third current difference; and outputting the driving signal to the switching tubes in the switching circuit to regulate duty ratios of the switching tubes, thereby suppressing DC bias of the high-frequency AC port;

acquiring voltage information or current information of the first DC port at N times, where N≥2; obtaining a corresponding first voltage difference or a first current difference according to the voltage information or the current information at the N times, regulating a duty ratio of a first driving signal according to the first voltage difference or the first current difference; and outputting the first driving signal to the switching tubes in the first switching circuit to regulate duty ratios of the switching tubes, thereby suppressing DC bias of the first high-frequency AC port;

acquiring voltage information or current information of the second DC port at N times, where N≥2; obtaining a corresponding first voltage difference or a first current difference according to the voltage information or the current information at N times, regulating a duty ratio of a second driving signal according to the first voltage difference or the first current difference; and outputting the second driving signal to the switching tubes in the second switching circuit to regulate duty ratios of the switching tubes, thereby suppressing DC bias of the second high-frequency AC port.

The DC bias suppression method applied to the high-frequency power conversion circuit of the disclosure solves the problem of DC bias in the resonant current of the high-frequency AC port when the high-frequency power conversion circuit is reversely operated, and it is unnecessary to make additional hardware filtering or phase-shift processing on the DC port voltages of the high-frequency power conversion circuit, so control is simple and easy to implement. Moreover, the range of application is wide, and it is suitable for frequency modulation control circuits (such as, LLC), and is also suitable for phase-shift control circuits (such as, DAB) or other non-LLC circuits including a bridge circuit. In addition, the method is flexible in sampling without filtering operation, and has a fast control speed.

Although the embodiments of the disclosure have been illustrated and described, as for those ordinary in the art, it can be understood that these embodiments may have various changes, modifications, replacements and variations without departing from principle and spirit of the disclosure, and the protection scope of the disclosure is determined by the scope defined by the appended claims.

What is claimed is:

1. A DC bias suppression method applied to a high-frequency power conversion circuit, wherein the high-frequency power conversion circuit comprises a high-frequency AC port, a switching circuit, a DC port and a power source connected sequentially, the DC bias suppression method comprising:

acquiring voltage information or current information of the DC port at N times, where N≥2;

obtaining a corresponding first voltage difference or a corresponding first current difference according to the voltage information or the current information at the N times, wherein when N>2, differences of the voltage information or the current information at every two adjacent times of the N times are produced to obtain (N−1) second voltage differences or second current differences, and the (N−1) second voltage differences or second current differences are accumulated to obtain the first voltage difference or the first current difference;

regulating a duty ratio of a driving signal according to the first voltage difference or the first current difference; and regulating duty ratios of switching tubes in the switching circuit according to the driving signal.

2. The DC bias suppression method according to claim 1, wherein amplitude limiting is performed on the second voltage differences or second current differences.

3. The DC bias suppression method according to claim 1, wherein when N=2, a time interval ΔT at the N times is a non-integer times of a switching period of the switching circuit, and amplitude limiting is performed on the first voltage difference or first current difference.

4. The DC bias suppression method according to claim 1, wherein, the N times comprise rising edge times and falling edge times of the switching tubes.

5. The DC bias suppression method according to claim 1, wherein, when the first voltage difference or the first current difference is greater than zero, the duty ratio of the driving signal is regulated to decrease, and when the first voltage difference or the first current difference is less than zero, the duty ratio of the driving signal is regulated to increase.

6. The DC bias suppression method according to claim 5, wherein, the first voltage difference or the first current difference is used as an input of a PI controller, a proportional regulating coefficient of the PI controller is $K_p$, and an integral regulating coefficient is $K_i$;

a reference duty ratio $D_1$ is obtained through the PI controller, and a difference between $D_1$ and an original duty ratio $D_0$ of the switching circuit is produced to obtain the duty ratio of the driving signal, thereby regulating the driving signal, and the first voltage difference is less than a voltage limit $E_{rrVmax}$, and the first current difference is less than a current limit $E_{rrImax}$.

7. The DC bias suppression method according to claim 6, wherein a value of $K_p$ satisfies the following conditions:

$$K_p > 0, K_p < 0.1/E_{rrmax} \text{ or } K_p < E_{rrImax}.$$

8. The DC bias suppression method according to claim 6, wherein values of $K_p$ and $K_i$ are:

$K_p=0.1/(E_{rrvmax})$, and $K_i=0.01*Kp*fc$, where fc is a control frequency of the PI controller.

9. The DC bias suppression method according to claim 1, wherein the duty ratio of the driving signal is regulated according to the first current difference, and a first sampling time is determined according to a rising edge time and a delay time of the switching tubes, a second sampling time is determined according to a falling edge time and the delay time of the switching tubes, and a difference of the current information of the DC port acquired at the first sampling time and the second sampling time is produced to obtain the first current difference.

10. The DC bias suppression method according to claim 9, wherein the delay time is $T_{delay}$, a time interval at the rising edge time and the falling edge time is $\Delta T_1$, and when the power source is pure resistive, $T_{delay}=0$; when the power source is resistor inductive, $$0 < T_{delay} < \frac{\Delta T1}{2};$$

when the power source is resistor capacitive, $$\frac{3}{2}\Delta T_1 < T_{delay} < 2\Delta T1.$$

11. The DC bias suppression method according to claim 1, wherein the switching circuit is a full-bridge circuit structure comprising a first bridge arm and a second bridge arm, and conduction angles of the first bridge arm and the second bridge arm differ by one phase to adjust a phase, thereby achieving phase-shift control.

12. A high-frequency power conversion circuit comprising m first side high-frequency circuits comprising first high-frequency AC ports, first switching circuits and first DC ports connected sequentially, and a controller, where $m\geq1$, wherein at least one of the m first side high-frequency circuits is controlled by the controller which is configured to perform steps of:

acquiring voltage information or current information of the first DC ports at N times, where $N\geq2$;

16 obtaining a corresponding first voltage difference or a first current difference according to the voltage information or the current information at the N times, wherein when $N>2$, differences of the voltage information or the current information at every two adjacent times of the N times are produced to obtain (N−1) second voltage differences or second current differences, and the (N−1) second voltage differences or second current differences are accumulated to obtain the first voltage difference or the first current difference;

regulating a duty ratio of a first driving signal according to the first voltage difference or the first current difference; and regulating duty ratios of switching tubes in the first switching circuits according to the first driving signal.

13. The high-frequency power conversion circuit according to claim 12, wherein, the high-frequency power conversion circuit further comprises m second side high-frequency circuits comprising second DC ports, second switching circuits and second high-frequency AC ports connected sequentially, m passive networks and m transformers, the m second high-frequency AC ports are connected to primary windings of the m transformers through the m passive networks, secondary windings of the m transformers are connected to the corresponding first side high-frequency circuit, and the m second side high-frequency circuits are controlled by the controller which is configured to perform steps of:

acquiring voltage information or current information of the second DC ports at N times;

obtaining a corresponding third voltage difference or a third current difference according to the voltage information or the current information of the second DC ports at the N times, and regulating a duty ratio of a second driving signal according to the third voltage difference or the third current difference; and regulating duty ratios of switching tubes in the second switching circuits according to the second driving signal.

14. The high-frequency power conversion circuit according to claim 13, wherein, each of the m passive networks comprises an inductor connected to the primary winding of one of the m transformers.

15. The high-frequency power conversion circuit according to claim 12, wherein, $m\geq2$, and output sides of the first DC ports of the m first side high-frequency circuits are connected in parallel.

16. The high-frequency power conversion circuit according to claim 12, wherein, $m\geq2$, the high-frequency power conversion circuit further comprises a second side high-frequency circuit, a passive network and a multi-winding transformer;

the first high-frequency AC ports of the m first side high-frequency circuits are connected to m secondary windings of the multi-winding transformer, respectively; and the second side high-frequency circuit is connected to a primary winding of the multi-winding transformer through the passive network.

* * * * *